(12) United States Patent
Yamamoto et al.

(10) Patent No.: US 10,942,154 B2
(45) Date of Patent: Mar. 9, 2021

(54) ULTRASONIC INSPECTION APPARATUS AND ULTRASONIC INSPECTION METHOD

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Setsu Yamamoto, Yokohama (JP); Jun Semboshi, Yokohama (JP); Azusa Sugawara, Kawasaki (JP); Kentaro Tsuchihashi, Yokohama (JP); Masaru Otsuka, Ota (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 132 days.

(21) Appl. No.: 16/270,441

(22) Filed: Feb. 7, 2019

(65) Prior Publication Data
US 2019/0242858 A1     Aug. 8, 2019

(30) Foreign Application Priority Data
Feb. 7, 2018    (JP) .............................. JP2018-020139

(51) Int. Cl.
*G01N 29/26*     (2006.01)
*G01N 29/04*     (2006.01)
(Continued)

(52) U.S. Cl.
CPC ............. *G01N 29/262* (2013.01); *G01H 5/00* (2013.01); *G01N 29/043* (2013.01);
(Continued)

(58) Field of Classification Search
CPC .... G01N 29/262; G01N 29/043; G01N 29/07; G01N 29/32; G01N 29/343; G01N 29/4463; G01N 29/0609
See application file for complete search history.

(56) References Cited

U.S. PATENT DOCUMENTS 5,268,876 A * 12/1993 Rachlin .................. G01H 3/125
367/11
5,570,691 A * 11/1996 Wright ................ G01S 7/52049
600/447

(Continued)

FOREIGN PATENT DOCUMENTS

EP    2 541 243 A1    1/2013
JP    5575157 B2    7/2014
(Continued)

OTHER PUBLICATIONS

Flax, S.W., et al., "Phase-Aberration Correction Using Signals From Point Reflectors and Diffuse Scatterers: Basic Principles", IEEE Transactions on Ultrasconics, Ferroelectrics, and Frequency Control, vol. 35 No. 6, Nov. 1988, XP011438908, pp. 758-767.
(Continued)

*Primary Examiner* — Helen C Kwok
(74) *Attorney, Agent, or Firm* — Oblon, McClelland, Maier & Neustadt, L.L.P.

(57) ABSTRACT

According to embodiments, an ultrasonic inspection apparatus comprises: an ultrasonic array probe having a plurality of ultrasonic elements; an estimated shape reflected wave arrival time calculator for computing the estimated shape reflected wave arrival time for the estimated shape reflected wave on the basis of the estimated sound velocity in the test object; an actual shape reflected wave arrival time extractor for extracting the actual shape reflected wave arrival time on the basis of the actual shape reflected wave; a shape reflected waves time difference calculator for computing the differ-
(Continued)

ence by subtracting the actual shape reflected wave arrival time from the estimated shape reflected wave arrival time as shape reflected waves time difference; and a delay time calculator for computing the delay times for mutually shifting the timings of ultrasonic wave transmission and ultrasonic wave reception by the ultrasonic elements, considering the shape reflected waves time differences.

6 Claims, 24 Drawing Sheets
(2 of 24 Drawing Sheet(s) Filed in Color)

(51) Int. Cl.
| | | |
|---|---|---|
| *G01N 29/06* | (2006.01) | |
| *G01N 29/34* | (2006.01) | |
| *G01N 5/00* | (2006.01) | |
| *G01N 29/32* | (2006.01) | |
| *G01N 29/44* | (2006.01) | |
| *G01N 29/07* | (2006.01) | |
| *G01H 5/00* | (2006.01) | |
| *B06B 1/06* | (2006.01) | |

(52) U.S. Cl.
CPC ......... *G01N 29/0609* (2013.01); *G01N 29/07* (2013.01); *G01N 29/32* (2013.01); *G01N 29/343* (2013.01); *G01N 29/4463* (2013.01); *B06B 1/0607* (2013.01); *G01N 2291/011* (2013.01); *G01N 2291/015* (2013.01); *G01N 2291/023* (2013.01); *G01N 2291/0289* (2013.01); *G01N 2291/044* (2013.01); *G01N 2291/106* (2013.01); *G01N 2291/2638* (2013.01)

(56) References Cited

U.S. PATENT DOCUMENTS

| | | | |
|---|---|---|---|
| 5,877,997 A * | 3/1999 | Fell | G01F 23/2962 367/908 |
| 7,740,583 B2 * | 6/2010 | Rigby | G01S 7/52025 600/437 |
| 2004/0258127 A1 * | 12/2004 | Ramamurthy | A61B 8/546 374/117 |
| 2005/0148874 A1 * | 7/2005 | Brock-Fisher | G01S 7/52049 600/447 |
| 2006/0004287 A1 | 1/2006 | Rigby et al. | |
| 2006/0235635 A1 * | 10/2006 | Intrator | G01S 7/5273 702/79 |
| 2013/0014587 A1 * | 1/2013 | Yamamoto | G01N 29/262 73/627 |
| 2013/0197824 A1 * | 8/2013 | Baba | G01S 15/8927 702/39 |
| 2014/0140167 A1 * | 5/2014 | Hunter | G01N 29/07 367/7 |
| 2019/0170701 A1 * | 6/2019 | Yamamoto | G01N 29/2437 |

FOREIGN PATENT DOCUMENTS

| | | |
|---|---|---|
| JP | 5889742 B2 | 2/2016 |
| KR | 10-2013-0014822 A | 2/2013 |

OTHER PUBLICATIONS

Fitting, D.W., et al., "Adaptive Array Imaging in Inhomogeneous Media", Ultrasonics Symposium, IEEE, 1992, Oct. 20, 1992, XP010103713, pp. 653-658.

* cited by examiner

FIG. 22
FIG. 23
FIG. 24
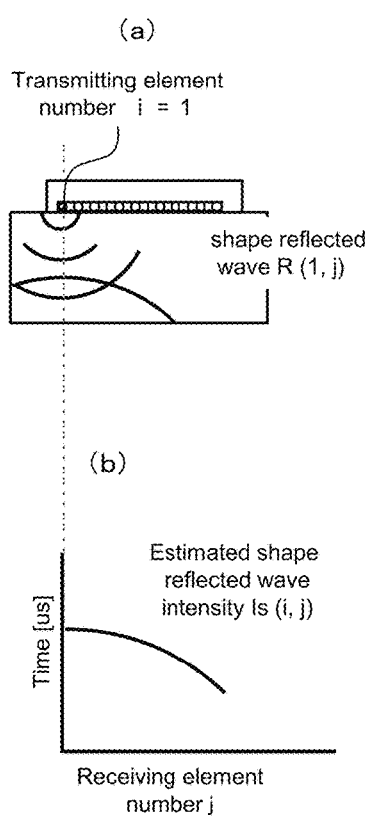
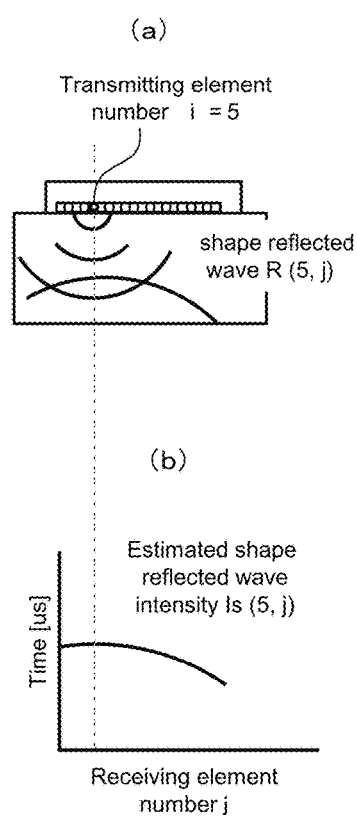
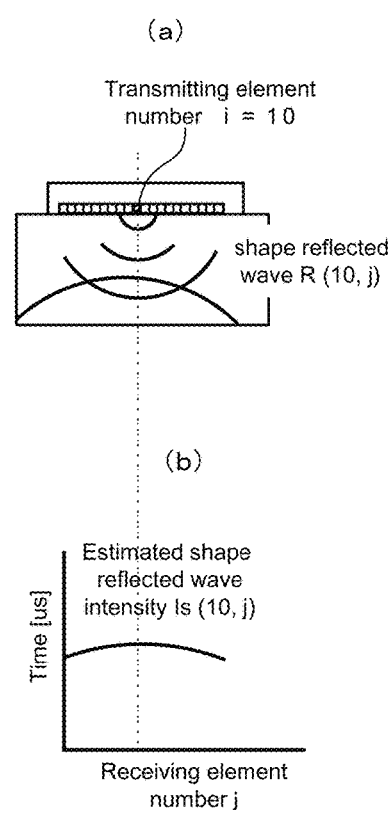

ULTRASONIC INSPECTION APPARATUS AND ULTRASONIC INSPECTION METHOD

CROSS-REFERENCE TO RELATED APPLICATION

This application is based upon and claims the benefit of priority from Japanese Patent Application No. 2018-020139 filed on Feb. 7, 2018, the entire content of which is incorporated herein by reference.

FIELD

The embodiments of the present invention relate to an ultrasonic inspection apparatus and an ultrasonic inspection method.

BACKGROUND

A technique of ultrasonic testing (UT) can confirm, in a non-destructive way, whether a structure is flawless both outside and inside, and has therefore become a technique indispensable in various technical fields. Phased array ultrasonic testing (PAUT) has a broad industrial use. In PAUT, piezoelectric elements, which are used as small ultrasonic elements for transmitting and receiving ultrasonic waves, are arranged and transmit ultrasonic waves, at different time intervals delayed from each other, thereby to generate waves having a given waveform. Unlike the inspection using a monocular probe, the phased array ultrasonic inspection can scan, at a time, a broad area at a plurality of angles, or scan a test object having a complicated shape. Hence, the phased array ultrasonic inspection is very advantageous in that the man-hours required can be reduced.

However, there arises acoustic anisotropy to the test object when the test object has an isotropic welded section or has a structure in which the crystal grains have been coarsened. In such an instance, the sound velocity and the attenuation coefficient can be varied according to the acoustic anisotropy depending on the ultrasonic wave propagation path. If such variance occurs, it affects the results of the inspection as an error attributable to the acoustic anisotropy in the ultrasonic inspection. Various countermeasures have been proposed to cope with such problem.

Techniques for reducing errors in propagation distances have been proposed by paying attention to the fact that the acoustic characteristics of the welded section is different from that of the base material and by estimating a path by way of which the ultrasonic wave that enters the welded section is bent by a predetermined angle of refraction and gets to the flaw to be detected. However such techniques cannot be applied to an object showing random anisotropy as a whole because they require backup data that support the estimation and they also estimate an interaction at the interface of the base material and the weld metal that is designed in advance.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 22 is a schematic illustration showing the results of the estimated shape reflected wave intensity computation in the ultrasonic inspection method according to the embodiment, where the transmitting element number i is 1.

FIG. 23 is a schematic illustration showing the results of the estimated shape reflected wave intensity computation in the ultrasonic inspection method according to the embodiment, where the transmitting element number i is 5.

FIG. 24 m is a schematic illustration showing the results of the estimated shape reflected wave intensity computation in the ultrasonic inspection method according to the embodiment, where the transmitting element number i is 10.

DETAILED DESCRIPTION

Figure 1:
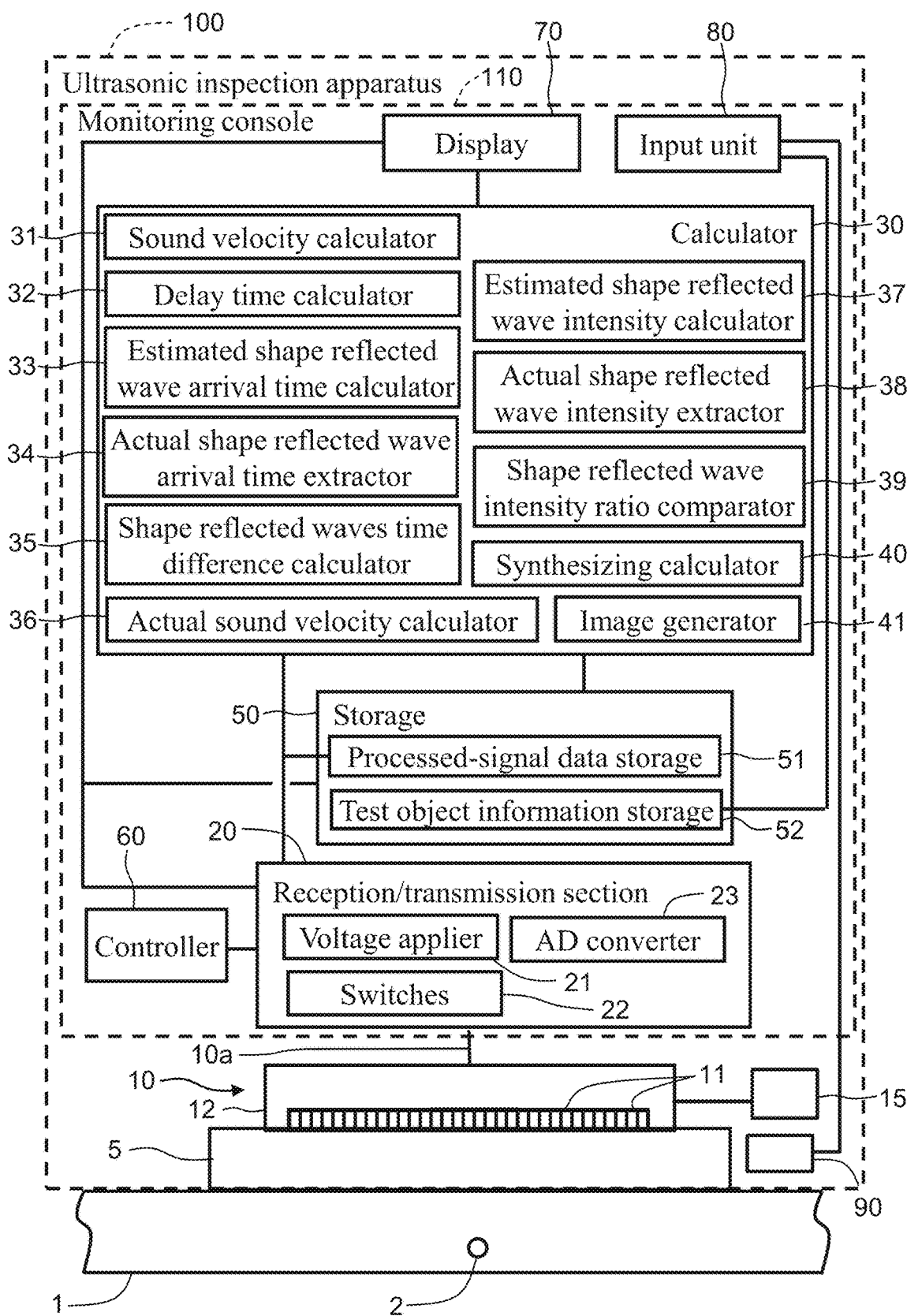
FIG. 1 is a block diagram showing a configuration of an ultrasonic inspection apparatus according to an embodiment.

An object of an embodiment of the invention is to reduce the influence of anisotropy of the test object in ultrasonic inspection.

According to an aspect of the present invention, there is provided an ultrasonic inspection apparatus comprising: an ultrasonic array probe having a plurality of ultrasonic elements arranged at predetermined positions for transmitting ultrasonic waves to a test object and receiving the ultrasonic waves reflected by the test object; an estimated shape reflected wave arrival time calculator for computing the estimated shape reflected wave arrival time of each of the estimated shape reflected waves on the basis of the estimated sound velocity in the test object, the estimated shape reflected wave arrival time being the estimated time for the estimated shape reflected wave to arrive at the ultrasonic element when the ultrasonic wave is reflected at the shape-indicating reflection part thereof; an actual shape reflected wave arrival time extractor for extracting the actual shape reflected wave arrival time on the basis of the actual shape reflected wave transmitted from the ultrasonic element used for ultrasonic wave transmission, propagated through the test object, reflected by a shape-indicating reflection part and received by each of the ultrasonic elements used for receiving the ultrasonic wave; a shape reflected waves time difference calculator for computing difference obtained by subtracting the actual shape reflected wave arrival time from the estimated shape reflected wave arrival time as shape reflected waves time difference; and a delay time calculator for computing delay times to be used for the purpose of mutually shifting timings of ultrasonic wave transmission and timings of ultrasonic wave reception by the ultrasonic elements, the delay time calculator taking the shape reflected waves time differences into consideration.

According to another aspect of the present invention, there is provided an ultrasonic inspection method comprising: an ultrasonic wave transmitting/receiving step for each of a plurality of ultrasonic elements belonging to an ultrasonic wave array probe to transmit an ultrasonic wave to a test object and receive reflected waves from the test object; an estimated shape reflected wave arrival time computing step for an estimated shape reflected wave arrival time calculator to calculate the estimated shape reflected wave arrival time on the basis of an estimated sound velocity in the test object; an actual shape reflected wave arrival time extracting step for an actual shape reflected wave arrival extracting section to extract an actual shape reflected wave arrival time on the basis of an actual shape reflected wave transmitted by the ultrasonic element to be used for transmission of an ultrasonic wave, propagated through inside of the test object, reflected by a shape-indicating reflection part and received by the ultrasonic element to be used for reception of the ultrasonic wave; a shape reflected waves time difference computing step for an shape reflected wave time difference computing section to calculate time difference between the estimated shape reflected wave arrival time and the actual shape reflected wave arrival time as shape reflected waves time difference; and a delay time computing step for a delay time calculator to calculate delay times to be used for mutually shifting timings of transmissions and receptions of ultrasonic waves by the ultrasonic elements, taking the shape reflected waves time differences into consideration.

Hereinafter, with reference to the accompanying drawings, embodiments of an ultrasonic inspection apparatus and an ultrasonic inspection method will be described. The same or similar portions are represented by the same reference symbols and will not be described repeatedly.

FIG. 1 is a block diagram showing a configuration of an ultrasonic inspection apparatus according to an embodiment. The ultrasonic inspection apparatus 100 nondestructively detects a flaw 2 existing inherently in the test object 1 by means of ultrasonic waves. The ultrasonic inspection apparatus 100 comprises a monitoring console 110, an ultrasonic array probe 10, a drive section 15 for driving the ultrasonic array probe 10 and a test object information acquiring section 90.

The ultrasonic array probe 10 includes a plurality of ultrasonic elements 11 and a holder 12 for holding the ultrasonic elements 11. The ultrasonic elements 11 are made of a ceramic material or a composite material. They may typically be piezoelectric elements that can transmit and receive ultrasonic waves by means of the piezoelectric effect thereof, piezoelectric elements that can exploit the piezoelectric effect provided by polymer films or some other elements that can otherwise transmit and receive ultrasonic waves. Each of the ultrasonic elements 11 has a damping member for damping ultrasonic waves and a front plate to be fitted to the front surface thereof and may be an element that is generally referred to as an ultrasonic probe.

The ultrasonic array probe 10 has a total of N (N: natural number) ultrasonic elements 11, arranged at predetermined positions, that transmit ultrasonic waves to the test object 1 and receive ultrasonic waves reflected and scattered by the test object 1 or a flaw 2.

In the following description, an ultrasonic array probe 10 that is generally referred to as linear array probe will be described as an example of ultrasonic array probe 10 having ultrasonic elements arranged at predetermined respective positions. In the linear array probe, ultrasonic elements 11 are one-dimensionally arranged in a first direction. But, the present embodiment is not limited to such an arrangement. The ultrasonic array probe 10 may alternatively be an array probe of some other type provided that the ultrasonic elements are arranged at predetermined positions. Still alternatively, the ultrasonic array probe 10 may be one that employs the so-called tandem testing technique of using ultrasonic elements of a plurality of different types in combination.

Ultrasonic array probes of different types include 1.5-dimensional array probes where the ultrasonic elements thereof are divided into groups of different sizes in the depth direction (in the second direction that is perpendicular to the first direction) of the linear array probe, matrix array probes where the ultrasonic elements 11 thereof are arranged two-dimensionally both in the first direction and in the second direction, ring array probes where the first direction is the direction of a ring and the ultrasonic elements 11 thereof are concentrically arranged, split-type ring array probes where the plurality of ultrasonic elements 11 of a ring array probe are circumferentially divided, non-uniform array probes where the ultrasonic elements 11 thereof are arranged non-uniformly, arcuate array probes where the first direction is that of an arc and the ultrasonic elements 11 thereof are arranged along the circumferential direction thereof at their respective positions and spherical array probes where the ultrasonic elements 11 thereof are arranged on a spherical surface.

Note that the ultrasonic array probe 10 can be made to be usable in any environment such as in a gaseous environment or in a liquid environment when it is caulked, packed or otherwise protected.

The drive section 15 drives the ultrasonic array probe 10 to move around the test object 1, while typically gripping the holder 12.

A wedge (not shown) may be employed in order to have ultrasonic waves enter the test object 1 at an angle that makes them show a high directivity. An isotropic material such as an acrylic material, a polyimide material, a gel material, or some other polymer material that can propagate ultrasonic waves and whose acoustic impedance is known may be employed for the wedge. Also, a material whose acoustic impedance is close to or same as the acoustic impedance of the front panel may be used for the wedge. Alternatively, a material whose acoustic impedance is close to or same as the acoustic impedance of the test object 1 may be used for the wedge. Still alternatively, a composite material that changes its acoustic impedance stepwise or gradually can be used for the wedge.

Additionally, a damping material may be arranged in and out of the wedge, a wave-dissipating member showing a mound-like profile may be arranged and/or a mechanism for reducing multiple reflections may be provided in order to prevent the multiple-reflected waves in the wedge from adversely affecting the results of flaw detection. Note that, in the following description, the wedge that may be employed when causing ultrasonic waves to enter the test object 1 from the ultrasonic array probe 10 is neither described nor illustrated for the purpose of simplicity.

Acoustic coupling is realized, in other words, any sounds can substantially pass entirely through between the ultrasonic array probe 10 and the wedge, between the wedge and the test object 1 and between the ultrasonic array probe 10 and the test object 1 when an acoustic propagation medium 5 is disposed there. The acoustic propagation medium 5 is typically water, glycerin, machine oil, castor oil, acryl, polystyrene, gel or the like, and some other medium can alternatively be used provided that it can propagate ultrasonic waves. Note that, in the following explanation, description of the acoustic propagation medium 5 that is employed to cause ultrasonic waves to enter the test object 1 from the ultrasonic array probe 10 may sometimes be omitted for the purpose of simplicity.

The test object information acquiring section 90 acquires information on the test object 1 such as the profile of the test object 1 and outputs the acquired information to an input unit 80 in the monitoring console 110. The test object information acquiring section 90 collectively and comprehensively refers to all the means for acquiring information on the test object 1. More specifically, the test object information acquiring section 90 includes a three-dimensional camera for acquiring appearance data of the test object 1, measuring means for measuring the temperatures of selected representative spots of the test object 1 in order to obtain the temperature distribution of the test object 1, temperature distribution computing means for computationally determining the temperature distribution in the test object 1 on the basis of the measured temperatures of the selected representative spots and so on. The test object information acquiring section 90 is provided when it is necessary to acquire information on the shape, the dimensions and the temperatures of the parts of the test object 1 that are not easily accessible. In other words, the test object information acquiring section 90 may not necessarily be provided when the information on the test object 1 as defined above is already known or when it can be obtained with ease.

The monitoring console 110 has a reception/transmission section 20, a calculator 30, a storage 50, a controller 60, a display 70 and an input unit 80. The monitoring console 110 includes a device having versatile arithmetic operation capabilities and data communication capabilities, which may typically be a PC (personal computer). The monitoring console 110 may contain the above-listed sections in itself or may be connected to them by way of communication cables.

The reception/transmission section 20 includes a voltage applier 21, switches 22 and an AD converter 23.

The voltage applier 21 can apply an electric potential difference that generates vibrations in the ultrasonic elements 11. The switches 22 bring the selected ultrasonic element 11 and the voltage applier 21 into an electrically mutually conductive state or into an electrically mutually non-conductive state. In other words, the switches 22 switch a state where an electric potential difference is applied to the selected ultrasonic element 11 to another state where no electric potential difference is applied to the selected ultrasonic element 11 or vice versa.

The voltage applier 21 applies a voltage having an arbitrarily selected waveform to the ultrasonic elements 11 that are put into an electrically conductive state by the switches 22. The waveform of the applied voltage may be that of a sine wave, a saw-tooth wave, a rectangular wave, a spike pulse or some other wave. The waveform of the applied voltage may be a so-called bipolar waveform having both positive polarity values and negative polarity values or a unipolar waveform having only positive or negative polarity values. A positive or negative offset value may or may not be added to the waveform. The waveform may be a single pulse waveform, a burst waveform or a continuous waveform. Furthermore, it may be so arranged that the duration of the voltage application can be increased or decreased and/or the number of repetitive waves can be increased or decreased.

Since the reflected waves that the ultrasonic elements 11 receive provide analog signals, which are continuous signals in terms of time, the AD converter 23 converts the received analog signals into digital signals so that the calculator 30 can operate for digital processing.

The input unit 80 receives the inputs from the outside and also from the test object information acquiring section 90. The inputs that the input unit 80 receives include information relating to the attributes of the test object 1 such as the shape, the dimensions and the material of the test object 1, information on the condition of the test object 1 such as the temperature of the test object 1 and other pieces of information. The information relating to the test object 1 that the input unit 80 receives is stored in the test object information storage 52 of the storage 50, which will be described hereinafter.

The display 70 displays images on the obtained test results and other pieces of information that the inspection staff and other members require, on the basis of the information it receives from the reception/transmission section 20, the calculator 30 and the storage 50. The display 70 displays those images systematically in a given procedural order or on an on-demand basis. The display 70 may be a liquid crystal display apparatus, a projector, a cathode-ray tube or the like provided that it can display digital data. The display 70 may have functions such as issuing warning signal in the form of sound or light in response to any of predefined conditions or operating as touch panel having a user interface feature of receiving inputs according to the operations conducted on the touch panel by the user.

The storage 50 has a processed-signal data storage 51 and a test object information storage 52. The processed-signal data storage 51 stores the information on the reflected waves, which is digital data on the reflected waves, obtained as a result of the AD conversions executed by the AD converter 23 of the reception/transmission section 20 for the reflected waves received by the ultrasonic array probe 10, and the results of the arithmetic processing operations executed at the responsible components of the calculator 30. The test object information storage 52 stores the information relating to the test object 1 received by the input unit 80.

The controller 60 monitors the status of the progress of the processing operation of each of the components in the monitoring console 110 so as to make the processing operations of the components in the monitoring console 110 proceed in a coordinated manner as a whole and controls the timing of each of the processing operations.

The calculator 30 performs processing such as determining the timing of transmission of an ultrasonic wave from each of the ultrasonic elements 11 and producing synthetic image data on the basis of the waveforms of the received ultrasonic waves. The calculator 30 has a sound velocity calculator 31, a delay time calculator 32, an estimated shape-reflected-wave arrival time calculator 33, an actual shape-reflected-wave arrival time extractor 34, an shape-reflected-waves time difference calculator 35, an actual sound velocity calculator 36, an estimated shape-reflected-wave intensity calculator 37, an actual shape-reflected-wave intensity extractor 38, a shape-reflected-wave intensity ratio comparator 39, a synthesizing calculator 40 and an image generator 41.

The sound velocity calculator 31 calculates the estimated sound velocity Vs in the test object 1 on the basis of the information on the shape, the dimensions, the temperature, the material and so on of the test object 1 stored in the test object information storage 52. The sound velocity calculator 31 assumes that each of the test object 1 and the acoustic propagation medium 5 is formed by an isotropic material that ensures an uniform sound velocity in it, which uniform sound velocity is not influenced by direction and position, and calculates the estimated sound velocity Vs in each of the object 1 and the acoustic propagation medium 5.

The delay time calculator 32 calculates the delay times for shifting the timings of transmissions and the timings of receptions of ultrasonic waves by the ultrasonic elements 11 relative to each other on the basis of the virtual delay times and the shape reflected waves time difference, which will be described hereinafter, because the delay times are necessary for causing all the ultrasonic waves transmitted from the ultrasonic elements 11 to converge to the focus 3 (FIGS. 2A and 2B).

Figure 2:
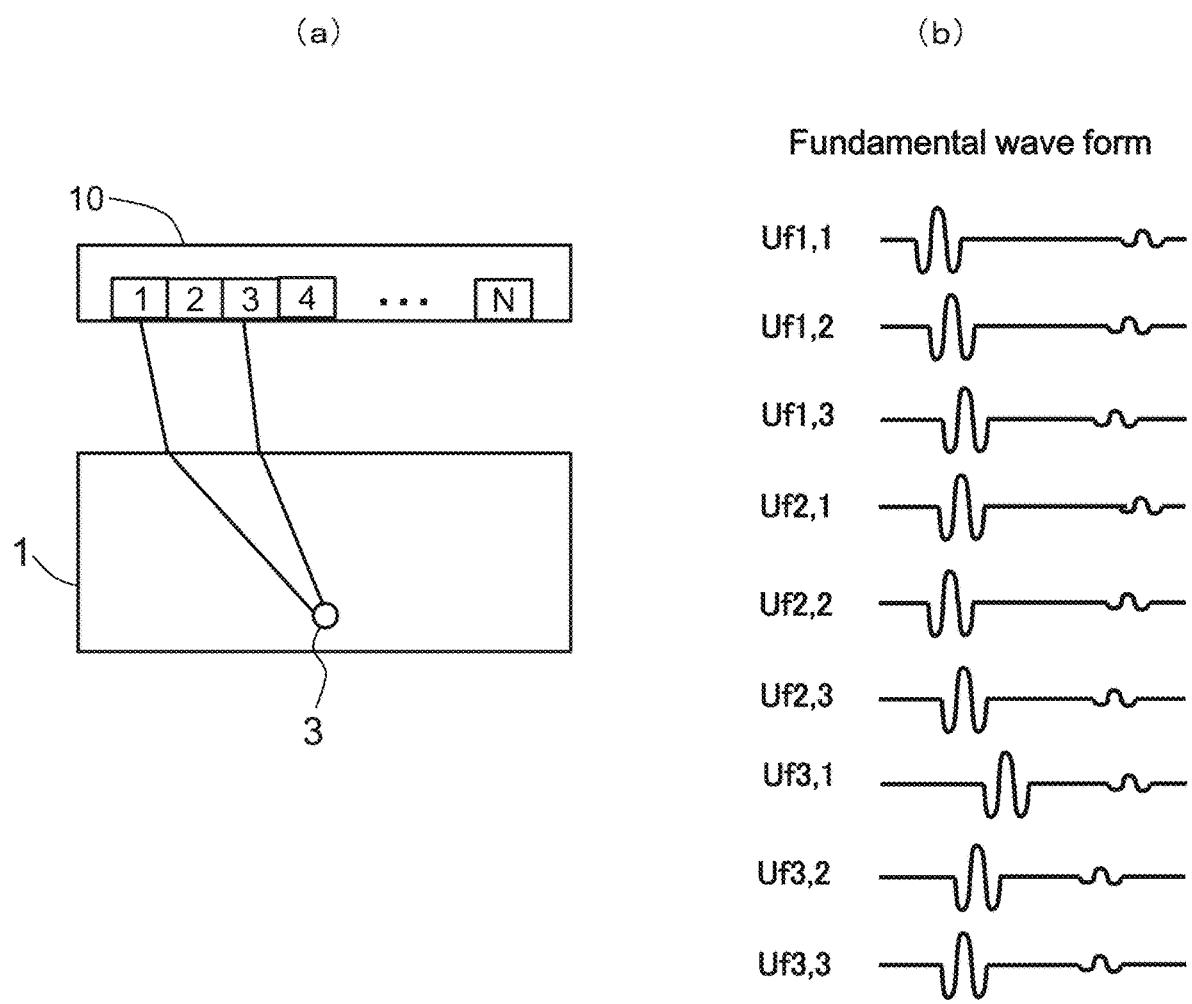
FIG. 2 is a schematic illustration of arrival time calculation in the ultrasonic inspection apparatus according to the embodiment. Left side (a) in FIG. 2 is a block diagram showing a conceptual configuration and right side (b) is a diagram showing the received signals when first to third ultrasonic elements transmit respective ultrasonic waves.

FIG. 2 is a schematic illustration of arrival time calculation in the ultrasonic inspection apparatus according to the embodiment. Left side (a) in FIG. 2 is a block diagram showing a conceptual configuration and right side (b) is a diagram showing the received signals when first to third ultrasonic elements transmit respective ultrasonic waves. Note that the expression of Uf (i, j) or Ufi,j indicates that the waveform is that of the reflected ultrasonic wave transmitted from the i-th ultrasonic element 11 and received by the j-th ultrasonic element 11. Even if the transmission timings of the first through third ultrasonic elements 11 are shifted relative to each other so as to cause them to converge to the focus 3 as shown in left side (a) of FIG. 2, the arrival times of the reflection signals vary from each other in a manner as shown in right side (b) of FIG. 2, because the propagation time differs among the signal reception paths.

Note that, in such an instance, the ultrasonic inspection apparatus 100 scans the test object 1 in the longitudinal direction by sequentially shifting the combination of three ultrasonic elements 11, or the set of three ultrasonic elements 11, such that the combination is firstly (1, 2, 3), secondly (2, 3, 4), thirdly (3, 4, 5) and so on to get to (N−2, N−1, N).

Figure 3:
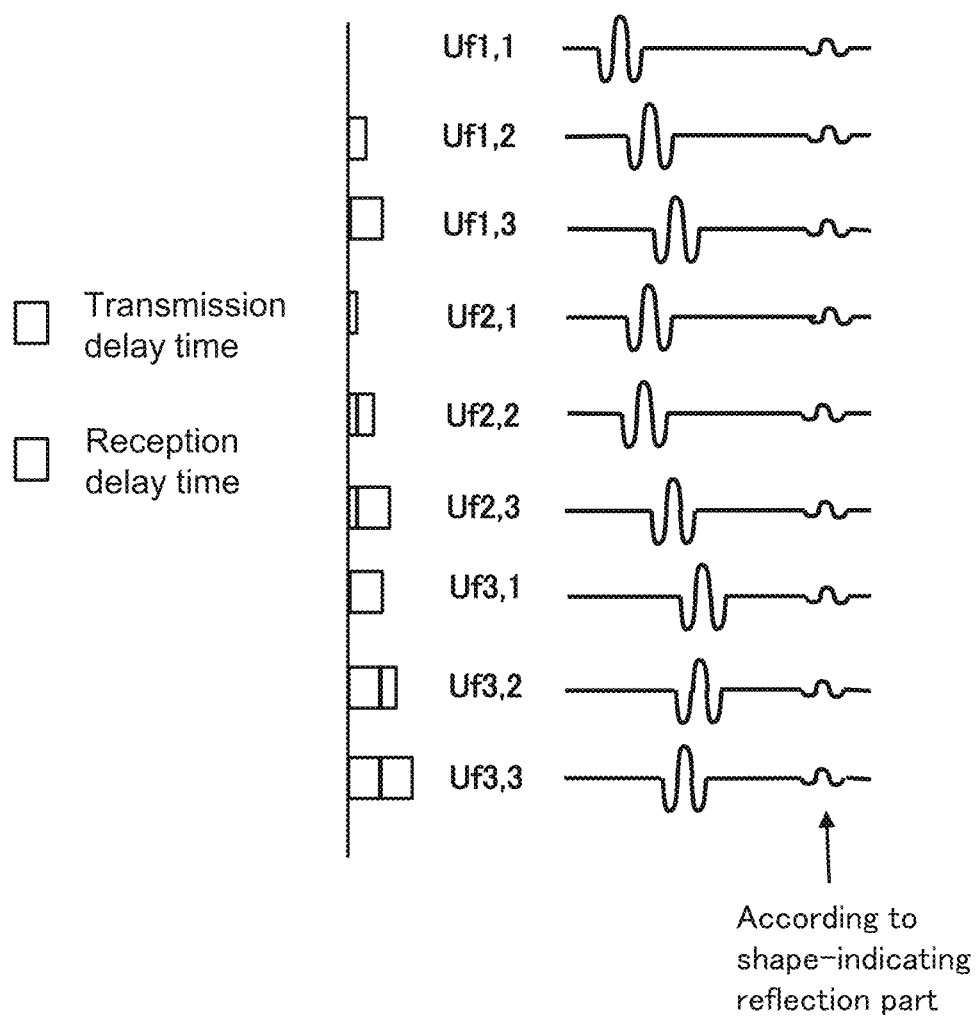
FIG. 3 is a waveform diagram showing the received signals considering the delay times of the ultrasonic elements according to the embodiment.

FIG. 3 is a waveform diagram showing the received signals considering the delay times of the ultrasonic elements according to the embodiment. More specifically, the clock times of the reflected waves in the waveforms Ufi,j of the received waves coincident with each other by taking both the delay times of the transmission side and those of the reception side into consideration. Namely, the arrival clock times of the reflected waves as received by the respective ultrasonic elements 11 coincident with each other.

The estimated shape-reflected-wave arrival time calculator 33 calculates the estimated shape reflected wave arrival time Ts (i, j) on the basis of the shape and the dimensions of the test object 1 stored in the test object information storage 52 and the estimated sound velocity Vs in the acoustic propagation medium 5, the estimated sound velocity Vs in the test object 1 and so on calculated by the sound velocity calculator 31. The estimated shape reflected wave arrival time Ts (i, j) is the estimated time during which the ultrasonic wave is transmitted and the estimated shape reflected wave Rs (i, j) of a transmitted ultrasonic wave gets to the reception side ultrasonic element 11.

Note that the expression of estimated shape reflected wave Rs (i, j) refers to a reflected wave that indicates a shape reflected wave that is estimated. The shape reflected wave refers to a received wave that is transmitted from the i-th ultrasonic element 11 and received by the j-th ultrasonic element 11 and the waveform of the received wave includes the waveform of the reflected wave reflected at a shape-indicating reflection part. The reflected wave reflected at a shape-indicating reflection part corresponds to the reflected wave shown in FIG. 3.

Also note that the expression of a shape-indicating reflection part refers to a part of the test object 1 that relates to the overall shape of the test object 1 or a representative part of the test object 1 in terms of the shape thereof. For example, a shape-indicating reflection part may be the rear surface that is located opposite to the incident surface where ultrasonic waves enter the test object 1, the interface of two materials of the test object 1 that differ from each other, a corner or a hole (a cooling hole or the like) in the test object 1. The shape of a shape-indicating reflection part that is a reflection surface of an ultrasonic wave is not necessarily a plane.

The estimated shape-reflected-wave arrival time calculator 33 calculates the estimated shape reflected wave arrival time Ts (i, j), which is the time that is required for each of the ultrasonic waves transmitted from an ultrasonic element 11 to be received by an ultrasonic element as an estimated shape reflected wave Rs (i, j) on the basis of the estimated sound velocity Vs, the coordinates of each of the ultrasonic elements 11 that is used to transmit and receive an ultrasonic wave and the positional relationship of the reflectors of the estimated shape reflected waves Rs (i, j).

The technique to be used for computing the propagation time may be the ray tracing technique that is generally employed for sound source tracking or a technique of numerical analysis such as finite element analysis. The obtained estimated shape reflected wave arrival time is expressed by Ts (i, j).

The actual shape-reflected-wave arrival time extractor 34 extracts the actual shape reflected wave arrival time Tr (i, j) on each of the actual shape reflected waves Rr (i, j) stored in the processed-signal data storage 51. Each of the actual shape reflected waves Rr (i, j) is transmitted from the i-th (i=1, 2, 3, . . . , N) ultrasonic element 11 to be used for an ultrasonic wave transmission, propagated in the test object 1, reflected at a shape-indicating reflection part in the test object 1 and received by the j-th (j=1, 2, 3, . . . , N) ultrasonic element to be used for an ultrasonic wave reception. In the following description, the expression of (i, j) indicates the combination of the transmission from the i-th ultrasonic element and the reception by the j-the ultrasonic element.

The shape-reflected-waves time difference calculator 35 calculates a shape reflected waves time difference Td (i, j) by subtracting the actual shape reflected wave arrival time Tr (i, j) from the estimated shape reflected wave arrival time Ts (i, j).

The actual sound velocity calculator 36 calculates the actual sound velocity Va (i, j) by multiplying the estimated sound velocity Vs (i, j) that the sound velocity calculator 31 has calculated by the ratio of the estimated shape reflected wave arrival time Ts (i, j) to the actual shape reflected wave arrival time Tr (i, j).

The estimated shape-reflected-wave intensity calculator 37 calculates the estimated shape reflected wave intensity Is (i, j), which is the intensity of the ultrasonic wave received by the ultrasonic element 11, by simulating the damping of the ultrasonic wave during the propagation thereof and other factors on the basis of the information relating to the test object 1 stored in the test object information storage 52.

The actual shape-reflected-wave intensity extractor 38 extracts the actual shape reflected wave intensity Ir (i, j) of the actual shape reflected wave Rr j).

The shape-reflected-wave intensity ratio comparator 39 calculates the ratio of the estimated shape reflected wave intensity Is (i, j) to the actual shape reflected wave intensity Ir (i, j) as shape reflected wave intensities ratio Id (i, j).

The synthesizing calculator 40 makes the arrival clock times of the reflected waves received by the respective ultrasonic elements 11 coincide with each other according to their respective delay times and then obtains a synthetic waveform M by synthetically combining those received waves.

The image generator 41 computationally determines the image data to be displayed on the basis of the synthetic waveform M, the propagation paths of the ultrasonic beams and the sound velocity on the transmission paths.

Figure 4:
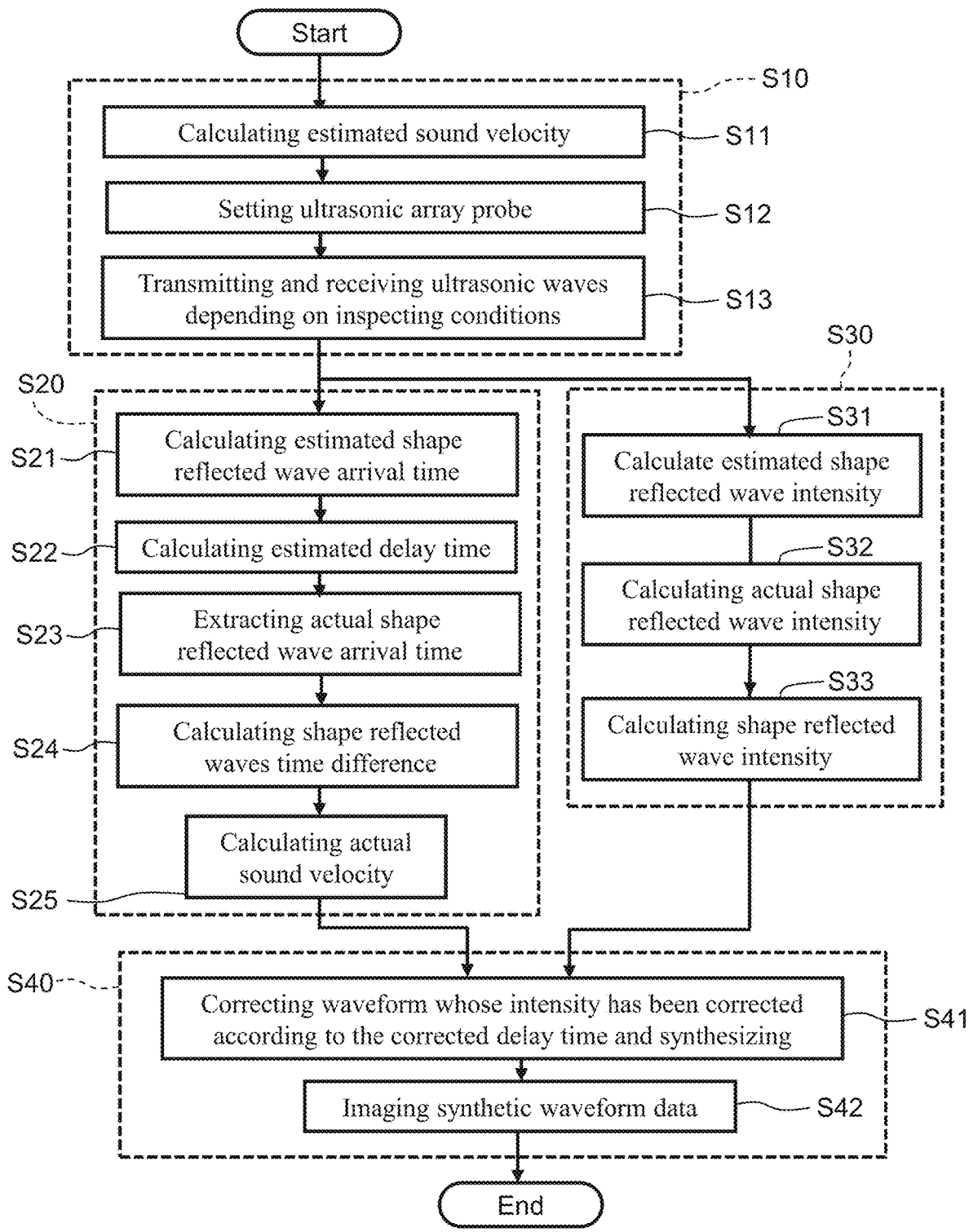
FIG. 4 is a flow chart showing a sequence of an ultrasonic inspection method according to the embodiment.

FIG. 4 is a flow chart showing a sequence of an ultrasonic inspection method according to the embodiment.

First, the estimated sound velocity is calculated (Step S11). More specifically, the sound velocity calculator 31 calculates the estimated sound velocity Vs in the test object 1 and the estimated sound velocity Vs in the acoustic propagation medium 5 on the basis of the information relating to the test object 1 stored in the test object information storage 52.

Additionally, the ultrasonic array probe 10 is set up on the test object 1 (Step S12). At this time, if necessary, an acoustic propagation medium 5 is placed between the test object 1 and the ultrasonic array probe 10. The drive section 15 grips the holding section 12 of the ultrasonic array probe 10 to set up the ultrasonic array probe 10 at the predetermined position.

Then, an operation of transmitting and receiving ultrasonic waves is executed in a manner that may vary depending on the inspecting conditions (Step S13). At the time of transmitting ultrasonic waves, an ultrasonic wave is irradiated from one or more of the ultrasonic elements 11 and received by one or more of the ultrasonic elements 11 in the ultrasonic array probe 10. Then, as a result, an ultrasonic waveform Uf (i, j) can be obtained by each of the combinations of transmitting and receiving ultrasonic elements 11.

Note that the operation of Step S13 needs to be executed after Step S12. However, Step S11 may come before or after Step S12 or Step S13.

Figure 5:
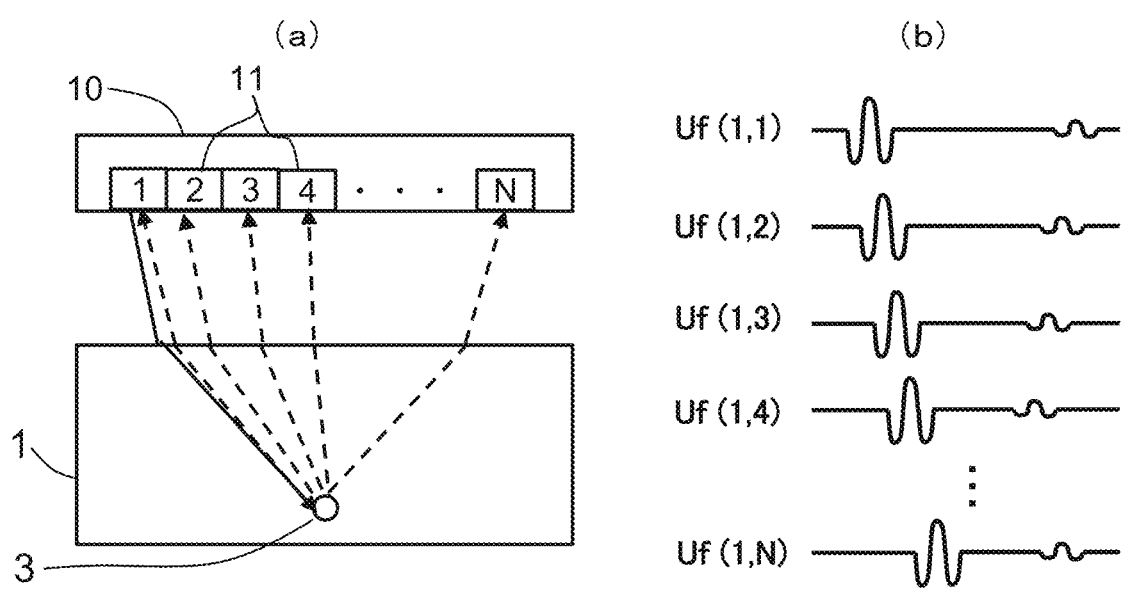
FIG. 5 shows transmission and reception of the ultrasonic waves by the ultrasonic inspection method according to the embodiment. Left side (a) in FIG. 5 is a block diagram and right side (b) is a wave form diagram of received signals by each ultrasonic elements when the ultrasonic is sent by a first ultrasonic element.
Figure 6:
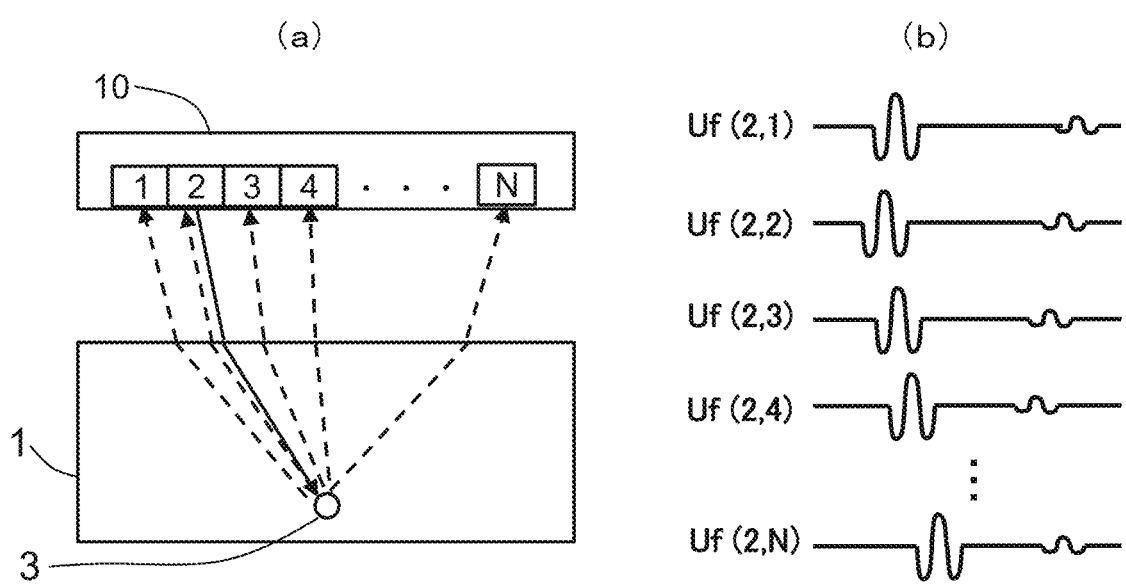
FIG. 6 shows transmission and reception of the ultrasonic waves by the ultrasonic inspection method according to the embodiment. Left side (a) in FIG. 6 is a block diagram and right side (b) is a wave form diagram of received signals by each ultrasonic elements when the ultrasonic is sent by a second ultrasonic element.
Figure 7:
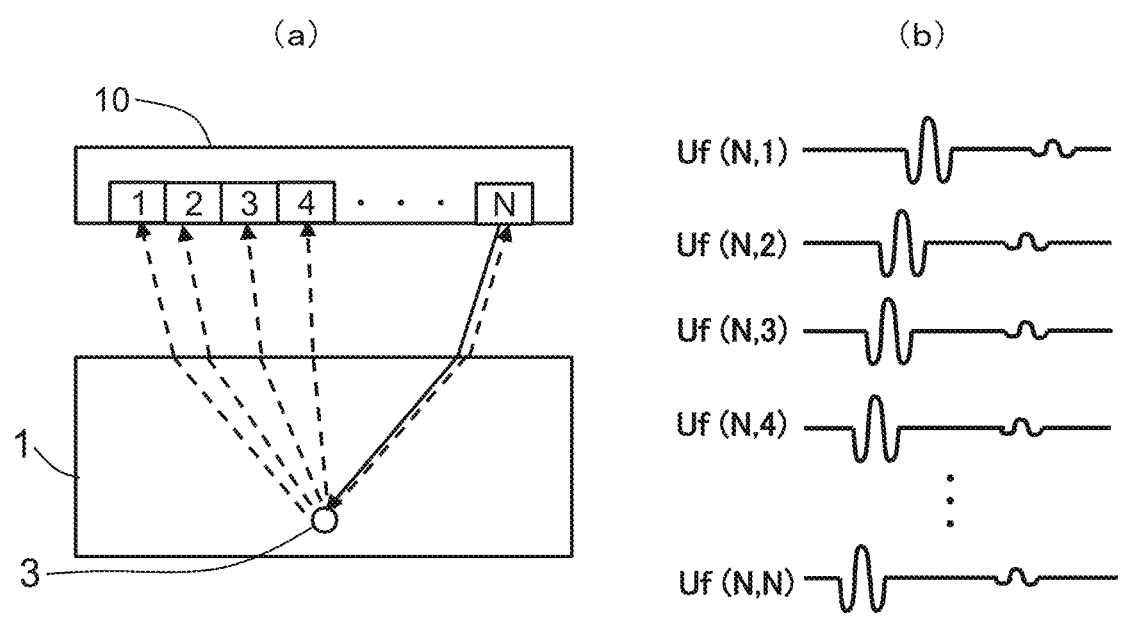
FIG. 7 shows transmission and reception of the ultrasonic waves by the ultrasonic inspection method according to the embodiment. Left side (a) in FIG. 7 is a block diagram and right side (b) is a wave form diagram of received signals by each ultrasonic elements when the ultrasonic is sent by a N-th ultrasonic element.

FIG. 5 shows transmission and reception of the ultrasonic waves by the ultrasonic inspection method according to the embodiment. Left side (a) in FIG. 5 is a block diagram and right side (b) is a wave form diagram of received signals by each ultrasonic elements when the ultrasonic is sent by a first ultrasonic element. Similarly, FIG. 6 shows a block diagram and a wave form diagram when the ultrasonic is sent by a second ultrasonic element, and FIG. 7 shows a bock diagram and a wave form diagram when the ultrasonic is sent by a N-th ultrasonic element.

The ultrasonic waveforms Uf (1, 1) through Uf (1, N) as shown in FIG. 5 are obtained when an ultrasonic wave is transmitted from the first ultrasonic element 1 and received by the first through N-th ultrasonic elements 11. Similarly, the ultrasonic waveforms Uf (2, 1) through Uf (2, N) as shown in FIG. 6 are obtained when an ultrasonic wave is transmitted from the second ultrasonic element 11 and received by the first through N-th ultrasonic elements 11. Furthermore, the ultrasonic waveforms Uf (N, 1) through Uf (N, N) as shown in FIG. 7 are obtained when an ultrasonic wave is transmitted from the N-th ultrasonic element 11 and received by the first through N-th ultrasonic elements 11.

Thus, when the ultrasonic array probe 10 having N ultrasonic elements 11 is employed and the transmitting element is sequentially shifted while each of the transmitted ultrasonic wave is being received by N ultrasonic elements 11 in the above described manner, N×N ultrasonic wave patterns can maximally be recorded. Note that it is possible to use a single ultrasonic element 11 exclusively for reception and use a plurality of ultrasonic elements 11 only for transmission. Furthermore, it is possible to turn an ultrasonic wave into a plane wave by using the delay time as multiplier and converge or diffuse ultrasonic waves.

The ultrasonic waves that enter the test object 1 are reflected and scattered by a flaw 2, which may typically be a crack or an inclusion existing in the inside or on the surface of the test object 1, and the reflected ultrasonic waves are received by the ultrasonic elements 11 of the ultrasonic array probe 10.

After Step S13, an arithmetic operation for correcting the temporal relations (Step S20) and an arithmetic operation for correcting the intensity relations (Step S30) will be executed. Each of the above-listed arithmetic operations will be described in detail hereinafter. Note that it does not matter if Step S20 comes before or after Step S30.

For the temporal relations correcting arithmetic operation (Step S20), firstly, the estimated shape-reflected-wave arrival time calculator 33 calculates the estimated shape reflected wave arrival time (Step S21) for each reflected ultrasonic wave. The estimated shape-reflected-wave arrival time calculator 33 presumes that the test object 1 has an acoustic characteristic that is uniform and independent of direction and position and estimates the elapsed time since the time when an ultrasonic wave is transmitted from one of the ultrasonic elements 11 to the time when it is received as a shape reflected wave by each of the ultrasonic elements 11 from the coordinates of the ultrasonic element 11 employed for the transmission and also for the reception and also from the positional relationship of the reflector of the estimated shape reflected wave Rs (i, j).

Figure 8:
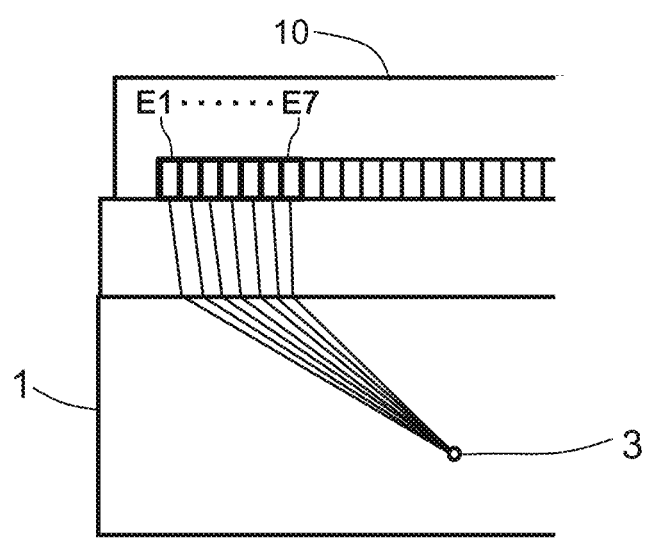
FIG. 8 is a conceptual illustration of delay time calculation in the ultrasonic inspection method according to the embodiment.

FIG. 8 is a conceptual illustration of delay time calculation in the ultrasonic inspection method according to the embodiment. For instance, ultrasonic waves are transmitted respectively from a plurality of ultrasonic elements 11, which may be K ultrasonic elements 11 denoted respectively by E1 through EK, in such a fashion that they converge to focus 3. K is 7 in the instance of FIG. 8.

Assume here that the propagation length and the propagation velocity at each of the meshes, or mesh k (k=1, 2, 3, . . . , K), located on the propagation path from the i-th ultrasonic element 11, or Ei, to the focus 3 are respectively Lk and Vk (k=1, 2, . . . , K). Note that the arithmetic operation of computing the propagation length Lk is based on the use of the center position of the ultrasonic element 11. The propagation time T from the i-th ultrasonic element 11 to the focus 3 is determined by means of formula (1) shown below:

$$T = \Sigma (Lk/Vk) \qquad (1),$$

where Σ is the total from k is 1 to k is K.

The estimated shape-reflected-wave arrival time calculator 33 executes calculation on an assumption that each of the materials involved in the calculation is uniform. Stated in a different fashion, when only the acoustic propagation medium 5 and the test object 1 are involved in the propagation path of an ultrasonic wave from the point where it is transmitted to the point where it is reflected, no mesh division is introduced to them. Namely, K=2. In this instance, an estimated sound velocity Vs is selected for each of the acoustic propagation medium 5 and the test object 1, and the estimated shape reflected wave arrival time Ts (i, j) is calculated on the basis of the estimated velocities of sound Vs.

When the acoustic propagation medium 5 is arranged between the ultrasonic array probe 10 and the test object 1, the point at which the ultrasonic wave transmitted from each of the ultrasonic elements 11 enters the test object 1 is computationally determined by using Snell's law and then the transmission time that is required for the propagation is computationally determined by using the sound velocity in the acoustic propagation medium 5 and that in the test object 1. Thereafter, the delay time is calculated for the ultrasonic wave.

Figure 9:
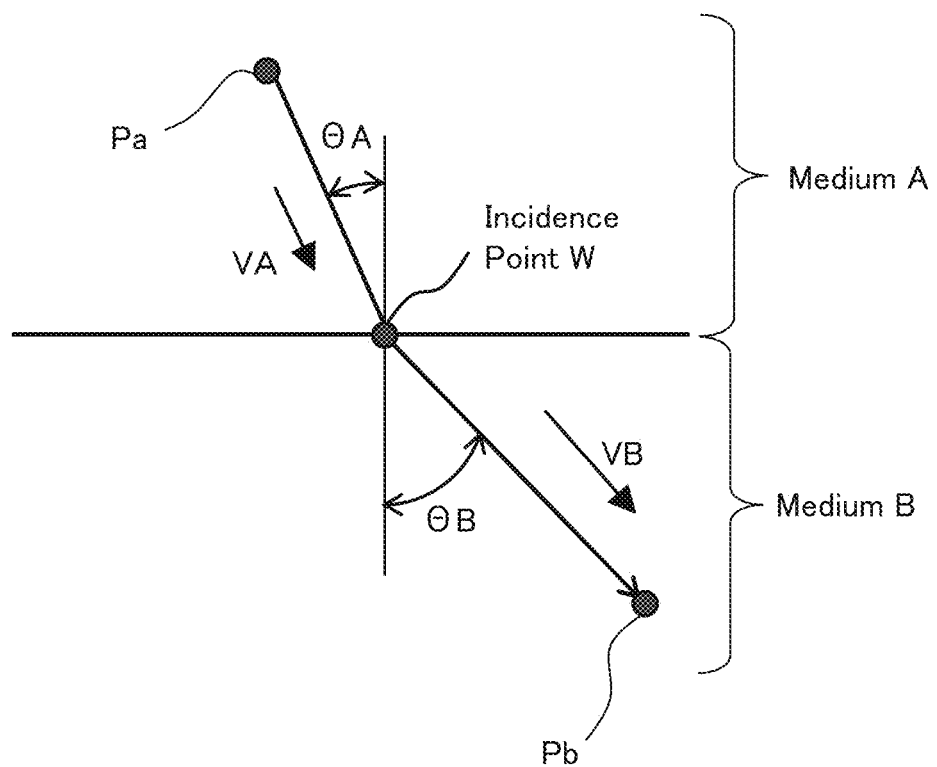
FIG. 9 is a diagram illustrating the path of an ultrasonic wave for explanation of Snell's law.

FIG. 9 is a diagram illustrating the path of an ultrasonic wave for explanation of Snell's law. The path from the starting point Pa in medium A (which corresponds to the acoustic propagation medium 5) to the terminal point Pb in medium B (which corresponds to the test object 1) in the system that includes the test object 1 can be determined by using Snell's law. Now, assume that the sound velocity in the medium A is VA and the sound velocity in the medium B is VB, while the angle of incidence for an ultrasonic wave to enter from the medium A into the medium B is θA and the angle of refraction is θB. Then, as for the path from the starting point Pa in the medium A to the terminal point Pb in the medium B, an incidence point W that satisfies the requirement of formula (2) shown below can be determined. Then, as a result, the path can be determined.

$$\sin \theta A / \sin \theta B = VA/VB \qquad (2)$$

In the case that surface profile S of the test object 1 is not an ordinary plane or an inclined plane but those having a certain radius of curvature or undulations or some other complex profile, geometrical calculations can be performed. Geometrical calculations for such a complex surface profile can be performed by considering information on the incident angle at the point, on the surface of the test object 1, where the ultrasonic wave enters, in the computation of the incident point W that uses Snell's law. The surface profile S of the test object 1 is included in the test object-related information, stored in the test object information storage 52, input from the test object information acquiring section 90 or directly from outside into the input unit 80.

Figure 10:
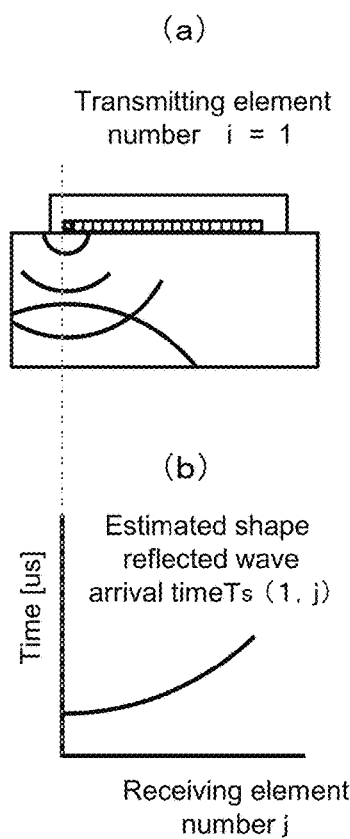
FIG. 10 is a schematic illustration for explaining an estimated shape reflected wave arrival time in the ultrasonic inspection method according to the embodiment, where the transmitting element number i is 1.
Figure 11:
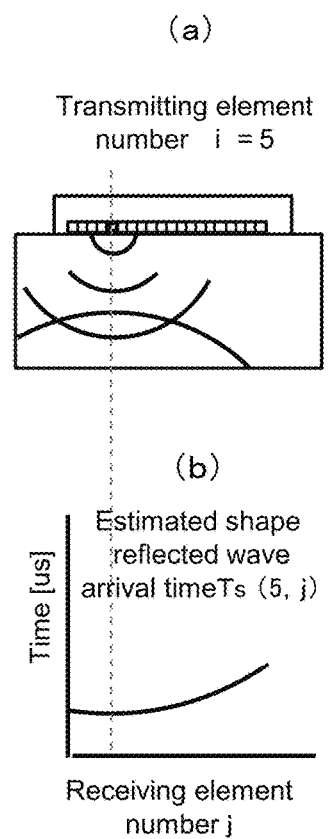
FIG. 11 is a schematic illustration for explaining an estimated shape reflected wave arrival time in the ultrasonic inspection method according to the embodiment, where the transmitting element number i is 5.
Figure 12:
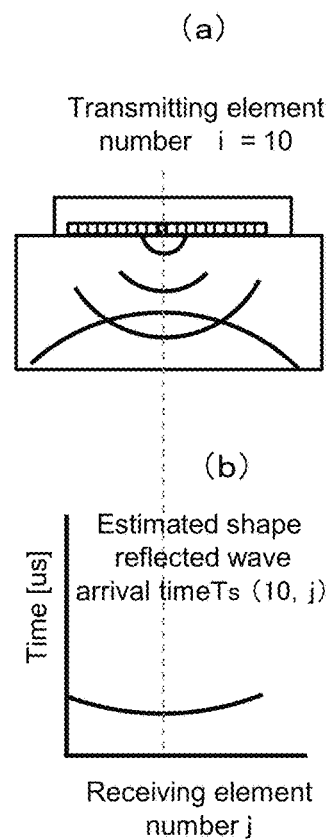
FIG. 12 is a schematic illustration for explaining an estimated shape reflected wave arrival time in the ultrasonic inspection method according to the embodiment, where the transmitting element number i is 10.

FIG. 10 is a schematic illustration for explaining an estimated shape reflected wave arrival time in the ultrasonic inspection method according to the embodiment. As shown in upper side (a) in each of FIGS. 10, 11 and 12, FIG. 10 shows a case where the transmitting element number i is 1, FIG. 11 shows a case where the transmitting element number i is 5, and FIG. 12 shows a case where the transmitting element number i is 10. In lower side (b) in each of FIGS. 10, 11 and 12, the horizontal axis indicates the number (i) of the receiving ultrasonic element 11 and the vertical axis, where "time [ρs]" is shown, indicates the estimated shape reflected wave arrival time Ts (i, j).

As shown in FIGS. 10 through 12, the ultrasonic wave that is generated from one of the ultrasonic elements is reflected at a shape-indicating part of the test object 1 and received by each of the ultrasonic elements 11 as estimated shape reflected wave Rs (i, j). Each of FIGS. 10 through 12 shows an instance where the bottom surface, which is the rear surface opposite to the surface of the test object 1 through which the ultrasonic wave enters the test object 1, is the shape-indicating part.

The ultrasonic wave that is transmitted from the i-th ultrasonic element 11, reflected at the shape-indicating part and received by the j-th ultrasonic element 11 is obtained as estimated shape reflected wave Rs (i, j). The time at which the ultrasonic wave that is transmitted from the i-th ultrasonic element 11 and reflected at the shape-indicating part so as to become the estimated shape reflected wave Rs (i, j) arrives at the ultrasonic wave receiving j-th ultrasonic element 11 is given as estimated shape reflected wave arrival time Ts (i, j). The estimated shape reflected wave arrival time Ts (i, j) is equal to the sum of the quotient calculated by dividing the length of the path in the acoustic propagation medium 5 by the estimated sound velocity Vs there and the quotient calculated by dividing the length of the path in the test object 1 by the estimated sound velocity Vs there.

When the transmitting element number i is equal to 1, the length of the path getting to the receiving ultrasonic element whose receiving element number j is equal to 1 is shortest and the estimated shape reflected wave arrival time Ts (1, 1) of that ultrasonic element is also shortest among all the estimated shape reflected wave arrival times Ts (1, j), as shown in FIG. 10. When the transmitting element number i is equal to 5, the length of the path getting to the receiving ultrasonic element whose receiving element number j is equal to 5 is shortest and the estimated shape reflected wave arrival time Ts (5, 5) of that ultrasonic element is also shortest among all the estimated shape reflected wave arrival times (5, j), as shown in FIG. 11. Likewise, when the transmitting element number i is equal to 10, the length of the path getting to the receiving ultrasonic element whose receiving element number j is equal to 10 is shortest and the estimated shape reflected wave arrival time Ts (10, 10) of that ultrasonic element is also shortest among all the estimated shape reflected wave arrival times (10, j) as shown in FIG. 12. In other words, FIGS. 10 to 12 show that the shape-indicating part is at the bottom surface, which is the bottom surface of a flat plate, and hence, if echoes from the bottom surface of the flat plate are assumed, the path length is shortest and the arrival time is shortest when i=j.

Then, the delay time calculator 32 calculates the estimated delay time (Step S22).

Figure 13:
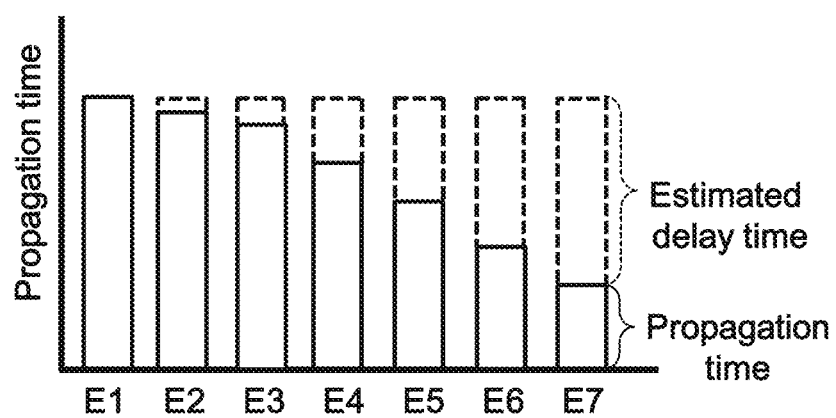
FIG. 13 shows the first graph for explaining the estimated delay time calculation in the ultrasonic inspection method according to the embodiment.

FIG. 13 shows the first graph for explaining the estimated delay time calculation in the ultrasonic inspection method according to the embodiment. The number of ultrasonic elements 11 that participate in transmission and reception of ultrasonic waves is equal to 7 as in the instance of FIG. 8. In FIG. 13, the vertical axis indicates the propagation time of ultrasonic wave from the focus 3 (FIG. 8) to each of the ultrasonic elements 11.

When both the estimated sound velocity Vs in the acoustic propagation medium 5 and the estimated sound velocity Vs in the test object 1 are assumed to be constant and ultrasonic waves are made to converge to the focus 3 by using a plurality of ultrasonic elements 11 (e.g., seven including E1 through E7 in FIG. 8) of the ultrasonic array probe 10 as shown in FIG. 8, the estimated delay times are the delay times that are assigned to the respective ultrasonic elements 11. Since both the estimated sound velocity Vs in the acoustic propagation medium 5 and the estimated sound velocity Vs in the test object 1 are assumed to show respective constant values, the estimated delay times can be determined on the basis of geometric information including the order of arrangement and the positions of the operated plurality of ultrasonic elements 11 of the ultrasonic array probe 10, the position of the focus 3 relative to the ultrasonic array probe 10 (the angle and the depth of the flaw detection) and so on. In other words, the estimated delay times are delay times that are estimated on the basis of the geometric profile of the test object 1 and on an assumption that both the estimated sound velocity Vs in the acoustic propagation medium 5 and the estimated sound velocity Vs in the test object 1 show respective constant values.

Referring to FIG. 8, since E1 is located remotest from the focus 3, the propagation time to the focus 3 becomes longest when E1 is the ultrasonic element 11 that transmits an ultrasonic wave, whereas the propagation time to the focus 3 when each of E2 through E7 is operated as the ultrasonic element 11 that transmits an ultrasonic element is shorter than the propagation time for E1. In FIG. 13, the propagation time for each of the ultrasonic elements 11 is indicated by a solid line and the estimated delay time for Ei that is the value obtained by subtracting the propagation time for Ei from the propagation time for E1 is indicated by a broken line.

Figure 14:
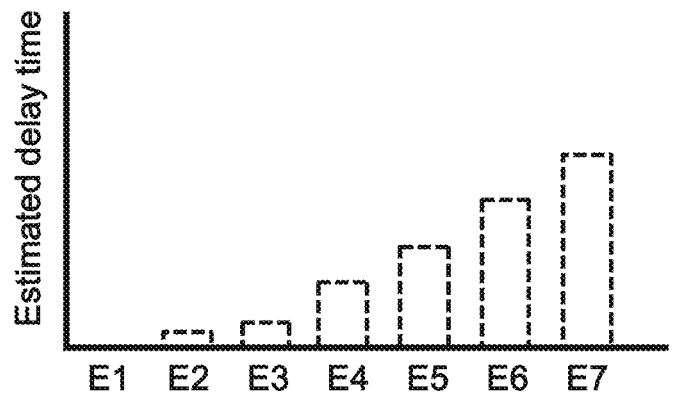
FIG. 14 shows the second graph for explaining the estimated delay time calculation in the ultrasonic inspection method according to the embodiment.

FIG. 14 shows the second graph for explaining the estimated delay time calculation in the ultrasonic inspection method according to the embodiment. This graph shows the estimated delay time for each of the ultrasonic elements 11 that is shown by a broken line in FIG. 13.

As a result of assigning estimated delay times respectively to a plurality of ultrasonic elements 11 of the ultrasonic array probe 10, it is now possible for the plurality of ultrasonic elements 11 to respectively transmit and receive ultrasonic waves that converge to the focus 3 provided that the estimated sound velocity Vs in the acoustic propagation medium 5 is assumed to be constant and also the estimated sound velocity Vs in the test object 1 is assumed to be constant. Note that, for this operation, it is possible to define a reference point in advance on the basis of the positional arrangement of the plurality of ultrasonic elements 11 to be operated. Additionally, when such a reference point is to be defined, the ultrasonic array probe 10 can be handled such that ultrasonic beams are transmitted from the reference point to the focus 3 and received at the reference point by each of the plurality of ultrasonic elements 11.

Next, the actual shape-reflected-wave arrival time extractor 34 extracts the actual shape reflected wave arrival time (Step S23).

Figure 15:
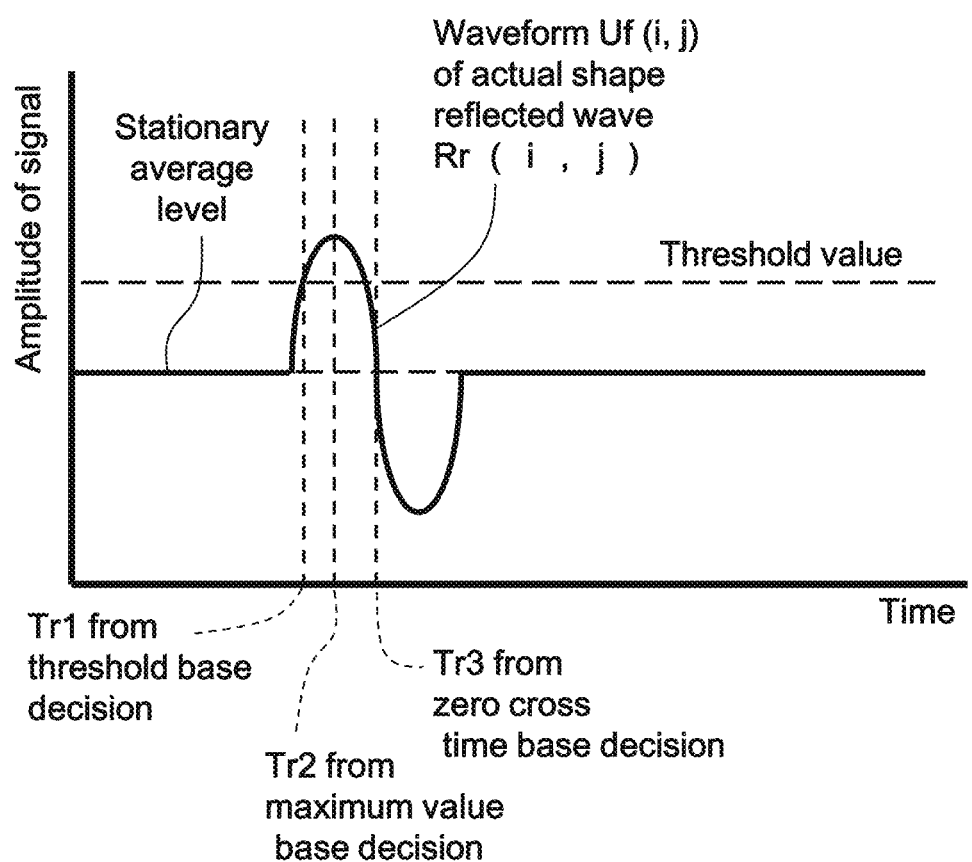
FIG. 15 is a schematic illustration for explaining the extraction of the arrival time in the ultrasonic inspection method according to the embodiment.

FIG. 15 is a schematic illustration for explaining the extraction of the arrival time in the ultrasonic inspection method according to the embodiment. As shown in FIG. 15, on the basis of the waveform Uf (i, j) of the actual shape reflected wave Rr (i, j) stored in the signal processing information storage section 51, the actual shape-reflected-wave arrival time extractor 34 extracts the information relating to the arrival time of the ultrasonic wave that includes this waveform and determines the arrival time.

Now, as an example, let's take an example where the typical waveform of the actual shape reflected wave Rr (i, j) is a pulse-shaped wave that has a simple waveform, and the pulse wave rises up at the positive side and then falls down to the negative side. The techniques that can be used to determine the arrival time will be described below.

With the first technique, the time when the first pulse at the positive side arrives at a threshold value for the first time is selected as an arrival time Tr1 of the actual shape reflected wave Rr (i, j).

With the second technique, the time when the first pulse at the positive side gets to the maximum value is selected as an arrival time Tr2 of the actual shape reflected wave Rr (i, j).

With the third technique, the time when the first pulse at the positive side is turned into the negative side, which is more specifically the time when the first pulse at the positive side intersects the stationary average level of the received signal is selected as an arrival time Tr3 of the actual shape reflected wave Rr (i, j).

Note, however, any technique other than the above-described ones can be adopted so long as it can reliably determine the arrival time. An extraction method is commonly employed for the group of waveforms Uf (i, j) (i, j=1, . . . . N) that are obtained in a single measurement session. While it is desirable that such an extraction method can also commonly be employed for the waveforms Uf (i, j) that are obtained in mutually different measurement sessions, the present invention is by no means limited to such a common use of an extraction method. Since the determining method is not subject to limitations, the component of the computing section 30 that is employed for this step is referred to as the actual shape-reflected-wave arrival time extractor 34.

Figure 16:
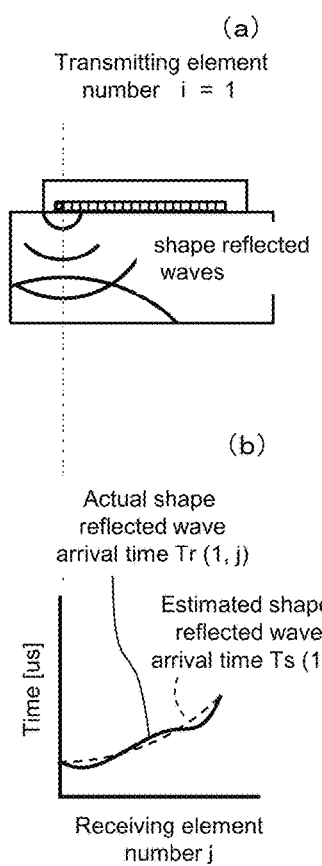
FIG. 16 is a schematic illustration showing the actual shape reflected wave arrival time in the ultrasonic inspection method according to the embodiment, where the transmitting element number i is 1.
Figure 17:
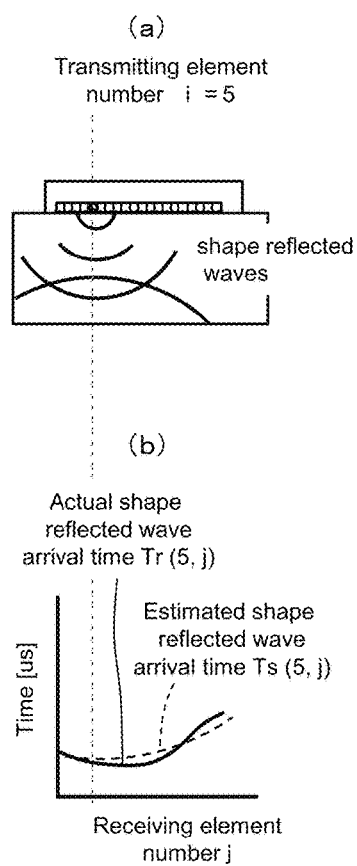
FIG. 17 is a schematic illustration showing the actual shape reflected wave arrival time in the ultrasonic inspection method according to the embodiment, where the transmitting element number i is 5.
Figure 18:
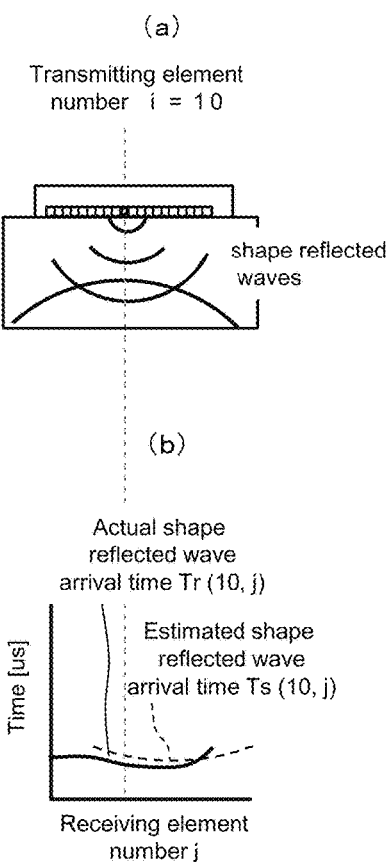
FIG. 18 is a schematic illustration showing the actual shape reflected wave arrival time in the ultrasonic inspection method according to the embodiment, where the transmitting element number i is 10.

FIG. 16 is a schematic illustration showing the actual shape reflected wave arrival time in the ultrasonic inspection method according to the embodiment, where the transmitting element number i is 1. FIG. 17 is a schematic illustration where the transmitting element number i is 5. FIG. 18 is a schematic illustration where the transmitting element number i is 10. In each of FIGS. 16, 17 and 18, the actual shape reflected wave arrival time is indicated by a solid line and the estimated shape reflected wave arrival time is indicated by a broken line for the purpose of ease of comparison. Since the estimated sound velocity Vs in the acoustic propagation medium 5 and the estimated sound velocity Vs in the test object 1 are assumed to have each constant values, the path length is the single determinant factor of the propagation time so that the estimated shape reflected wave arrival time Ts (i, j) for the ultrasonic element 11 whose receiving element number j is expressed by a relatively simple relation formula.

On the other hand, when the test object 1 is made of an anisotropic material that gives variances in the sound velocity as a function of position and direction or when the test object 1 has a temperature distribution inside thereof, he actual sound velocity Va in the test object 1 can delicately vary depending on the position in the test object 1. If such is the case, the path of an ultrasonic wave will be deviated from a linear path. Then, as a result, the actual shape reflected wave arrival time Tr (i, j) of each of the ultrasonic element 11 having a receiving element number j that is obtained on the basis of the actual response waveform Uf (i, j) will also be deviated from the corresponding estimated shape reflected wave arrival time Ts (i, j).

Thereafter, the shape-reflected-waves time difference calculator 35 calculates the shape reflected waves time difference (Step S24). To be more accurate, the shape-reflected-waves time difference calculator 35 calculates the shape reflected waves time difference Td (i, j) between the estimated shape reflected wave arrival time Ts (i, j) obtained by the estimated shape-reflected-wave arrival time calculator 33 and the actual shape reflected wave arrival time Tr (i, j) obtained by the actual shape-reflected-wave arrival time extractor 34. More specifically, the shape-reflected-waves time difference calculator 35 calculates the difference between the actual shape reflected wave arrival time Tr (i, j) and the estimated shape reflected wave arrival time Ts (i, j) of each combination of same elements to obtain the shape reflected waves time difference Td (i, j) for the combination of elements.

Figure 19:
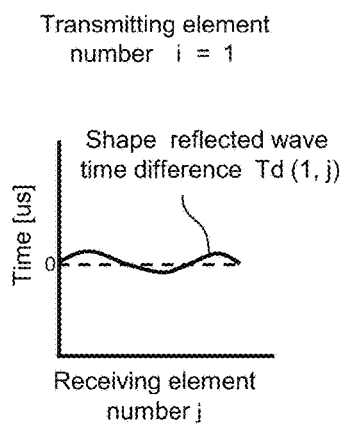
FIG. 19 is a schematic illustration showing the shape reflected wave time difference in the ultrasonic inspection method according to the embodiment, where the transmitting element number i is 1.
Figure 20:
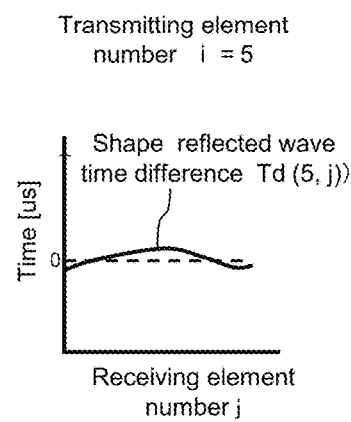
FIG. 20 is a schematic illustration showing the shape reflected wave time difference in the ultrasonic inspection method according to the embodiment, where the transmitting element number i is 5.
Figure 21:
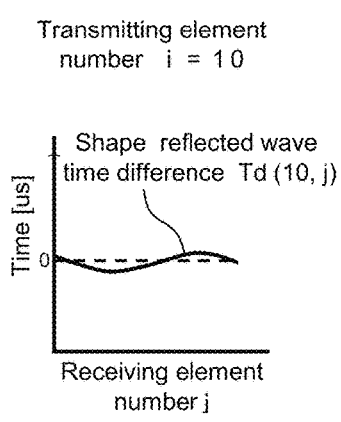
FIG. 21 is a schematic illustration showing the shape reflected wave time difference in the ultrasonic inspection method according to the embodiment, where the transmitting element number i is 10.

FIG. 19 is an illustration of the shape reflected waves time difference for the transmitting element number i=1. Similarly, FIG. 20 is for the transmitting element number i=5 and FIG. 21 is for the transmitting element number i=10. As seen from FIGS. 19 through 21, the shape reflected waves time difference Td (i, j) can take both positive polarity values and negative polarity values.

The obtained shape reflected waves time difference Td (i, j) can be reflected to the scheme for obtaining a synthetic waveform M. As described above, since the estimated delay time is calculated on the basis of the estimated sound velocity Vs that is obtained on an assumption that the test object 1 is made of an isotropic material, it is not possible to obtain an ideal synthetic wave M if the test object 1 shows anisotropy. For this reason, the delay time calculator 32 calculates the delay time after executing a corrective operation of adding or subtracting the shape reflected waves time difference Td (i, j) to or from the estimated delay time. In this way, the delay time calculator 32 calculates the delay time by taking the shape reflected waves time difference Td (i, j) into consideration for the estimated delay time and the synthesizing calculator 40 executes a synthesizing arithmetic operation on the received waves received by the respective ultrasonic elements 11 according to the delay time so that consequently it is possible to obtain a synthetic waveform M where the influence of anisotropy is minimized.

The shape reflected waves time difference Td (i, j) is obtained by subtracting the estimated shape reflected wave arrival time Ts (i, j) from the actual shape reflected wave arrival time Tr (i, j). Therefore, when the shape reflected waves time difference Td (i, j) is a negative value, it means that the actual shape reflected wave presumably arrives earlier than the estimated arrival time and hence the delay time will be obtained as an increment. When, to the contrary, the actual shape reflected wave presumably arrives later than the estimated arrival time, the delay time will be obtained as a decrement. The shape reflected waves time difference Td (i, j) can be used as correction value for the synthesizing arithmetic operation.

When the distances from the ultrasonic elements 11 to the focus 3 are significantly shorter than the distances from the ultrasonic elements 11 to the shape-indicating site that gives rise to estimated shape reflected waves Rs (i, j), for example when the depth of the focus 3 is shallow relative to the rear surface, and the shape reflected waves time difference Td (i, j) is simply added to or subtracted from the estimated delay time, the correction value that is obtained by taking the shape reflected waves time difference Td (i, j) into consideration can become too large. If such is the case, the shape reflected waves time difference Td (i, j) may be multiplied by a weighting factor before it is added to or subtracted from the estimated delay time for the computation of the delay time by the delay time calculator 32. Such a weighting factor can be determined on the basis of the ratio of the distance from the ultrasonic element 11 to the focus 3 to the distance from the ultrasonic element 11 to the shape-indicating site. Otherwise, it can appropriately be determined in advance by means of experiments or simulations. The weighting factor may be provided as a function of the ratio of the distance from the ultrasonic element 11 to the shape-indicating site to the distance from the ultrasonic element 11 to the focus 3.

Subsequently, the actual sound velocity calculator 36 calculates the actual sound velocity (Step S25).

Both of the reflected wave for which the estimated shape reflected wave arrival time Ts (i, j) is obtained in Step S21 and the reflected wave for which the actual shape reflected wave arrival time Tr (i, j) is obtained in Step S23 came through the substantially same propagation path from the viewpoint of approximation when the transmitting element number i and the receiving element numbers j agree with each other. Therefore, the actual sound velocity calculator 36 can estimate the actual sound velocity Va (i, j) from the ratio of the actual shape reflected wave arrival time Tr (i, j) to the estimated shape reflected wave arrival time Ts (i, j).

When the value obtained by normalizing the actual shape reflected wave arrival time Tr (i, j) by the estimated shape reflected wave arrival time Ts (i, j) is 2, for example, the actual sound velocity Va (i, j) can be determined (0.5 Vi) by multiplying Vi by the reciprocal number of the value. If the propagation path is made to have a part where the sound velocity is reliably constant (e.g. an acoustic propagation medium), the ratio need to be determined by using the value obtained by subtracting the propagation time in the acoustic propagation medium. Since the obtained actual sound velocity Va (i, j) corresponds to the combination of the transmitting ultrasonic element and the receiving ultrasonic element, the actual sound velocity Va (i, j) can be used for the computation of the delay time in instances where the transmitted waveform and the received waveform of the corresponding ultrasonic elements are employed.

The obtained actual sound velocity Va (i, j) can also be used as the sound velocity in the test object 1 for the arithmetic operation for obtaining the flaw image. In other words, the change with time of the waveform at each of the positions in the test object 1 can be calculated by using the actual sound velocity Va (i, j) and the path length to each of the positions after the ultrasonic wave transmission to the position.

On the other hand, as intensity-related correction value computation (Step S30), firstly, the estimated shape-reflected-wave intensity calculator 37 calculates the estimated shape reflected wave intensity (Step S31).

The estimated shape-reflected-wave intensity calculator 37 assumes that the test object 1 is made of an isotropic material having a uniform acoustic characteristic that is independent of direction and position. Then, the estimated shape-reflected-wave intensity calculator 37 estimates the intensity of the ultrasonic wave transmitted from each of the ultrasonic elements 11 and received by each of the ultrasonic elements 11 as shape reflected wave, on the basis of the coordinates of each of the ultrasonic elements 11 used for transmission and reception of ultrasonic wave and the positional relationship between the estimated reflected wave Rs (i, j) and the reflector.

In the estimation, the frequency of the ultrasonic wave that enters the test object 1, the propagation damping according to the elastic characteristic of the test object 1, the diffusion damping due to broadening of the sound field, the shape of the shape-indicating site where the estimated shape reflected wave Rs (i, j) is produced as a result of reflection and the mode conversion efficiency of the conversion from the longitudinal wave to the transverse wave and other factors are taken into consideration. The technique to be used for the estimation may be the ray tracing technique that is generally being employed for sound source tracking or a technique of numerical analysis such as a technique of finite element analysis. The sound source of the estimated shape reflected wave Rs (i, j) to be used for the computation is not limited to the reflected wave from the bottom surface shown above as an example but may be those from a corner or a hole (a cooling hole or the like) made in the test object 1 as in the instance of the estimated shape-reflected-wave arrival time calculator 33 described above for Step S21. In this way, the estimated shape-reflected-wave intensity calculator 37 calculates the estimated shape reflected wave intensity Is (i, j).

FIG. 22 is a schematic illustration showing the results of the estimated shape reflected wave intensity computation in the ultrasonic inspection method according to the embodiment, where the transmitting element number i is 1. FIG. 23 is a schematic illustration, where the transmitting element number i is 5. FIG. 24 m is a schematic illustration, where the transmitting element number i is 10. As seen from FIGS. 22, 23 and 24, when a bottom surface echo of a flat plate is assumed, the path length that contributes to damping and other phenomena is minimal and the estimated shape reflected wave intensity Is (i, j) is maximal when i=1.

Then, the actual shape-reflected-wave intensity extractor 38 extracts the actual shape reflected wave intensity Ir (i, j) (Step S32).

Figure 25:
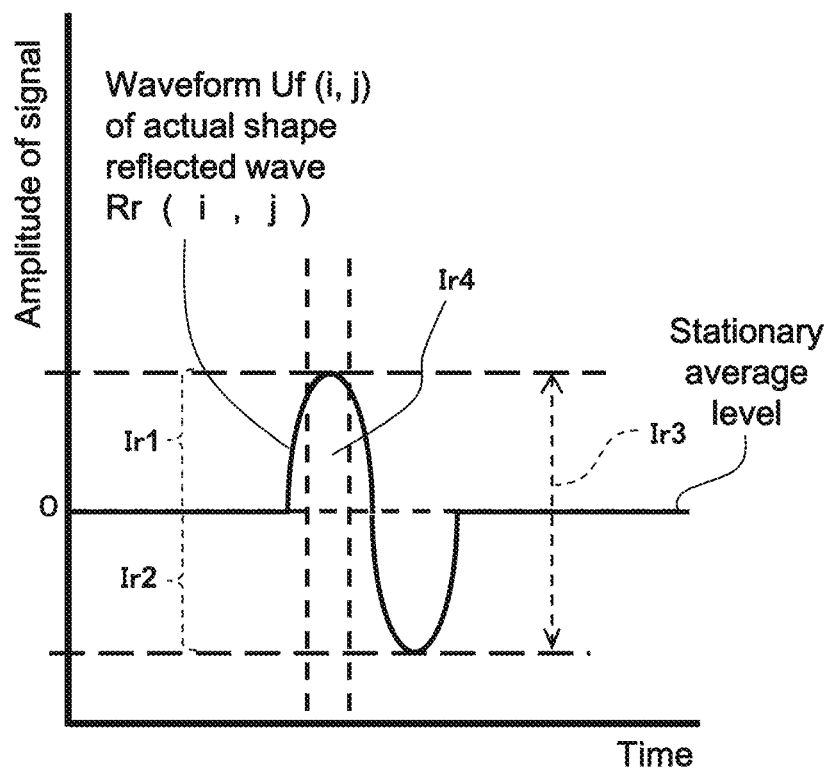
FIG. 25 is a schematic illustration for explaining computation of the reflected wave intensity at a reflected wave intensity extraction step in the ultrasonic inspection method according to the embodiment.

FIG. 25 is a schematic illustration for explaining computation of the reflected wave intensity at a reflected wave intensity extraction step in the ultrasonic inspection method according to the embodiment.

As shown in FIG. 25, the actual shape-reflected-wave intensity extractor 38 calculates the intensity Ir (i, j) of the reflected wave part of the waveform Uf (i, j) of the actual shape reflected wave Rf (i, j) on the basis of the waveform Uf (i, j) of the actual shape reflected wave Rf (i, j) stored in the signal processing information storage section 51.

Assume that a pulse wave rises up to the positive side and then falls down to the negative side as a waveform obtained by simplifying the typical waveform Uf (i, j) of the actual shape reflected wave Rr (i, j), as in Step S23. The techniques that can be used to determine the intensity will be described below as so many examples.

AS for the first technique, the absolute value Ir1 of the difference between the first positive side peak value and the stationary average level of the waveform Uf (i, j) is adopted as the value of the intensity Ir (i, j).

AS for the second technique, the absolute value Ir2 of the difference between the stationary average level and the negative side peak value of the waveform Uf (i, j) is adopted as the value of the intensity Ir (i, j).

AS for the third technique, the absolute value Ir3 of the difference between the positive side peak value and the negative side peak value of the waveform Uf (i, j) is adopted as the value of the intensity Ir (i, j).

AS for the fourth technique, in the waveform Uf (i, j), the absolute value Ir4 of the result obtained by time integration of a certain time domain is adopted as the value of the actual shape reflected wave intensity Ir (i, j). Either a time interval extending from before to after the clock time of the occurrence of the positive side peak value or a time interval extending from before to after the clock time of the occurrence of the negative side peak value may be used for the time integration.

Any technique other than the above listed ones may alternatively be employed so long as such a technique can provide such results that are decided stably. A same intensity extracting method is commonly employed for the group of waveforms Uf (i, j) (i, j=1, . . . , N) obtained in a single measurement session. A same intensity extracting method is preferably but not necessarily employed for the waveforms Uf (i, j) obtained in different measurement sessions. Since the method for determining the intensity is not subject to any limitations, the component of the computing section 30 that is operated in this step is referred to as actual shape-reflected-wave intensity extractor 38.

Figure 26:
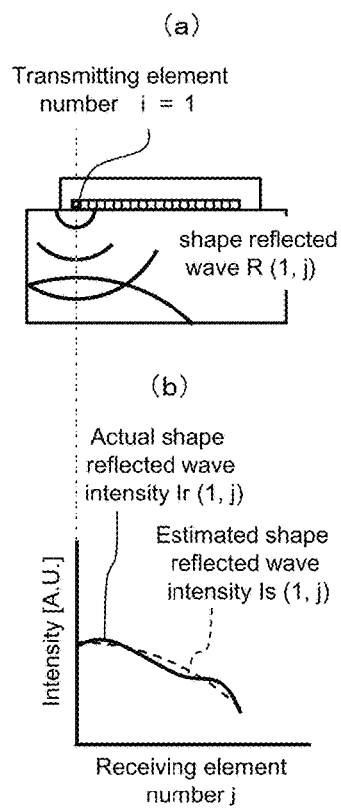
FIG. 26 is a schematic illustration showing the actual shape reflected wave intensity obtained by the actual shape reflected wave intensity extraction step in the ultrasonic inspection method according to the embodiment, where the transmitting element number i is 1.
Figure 27:
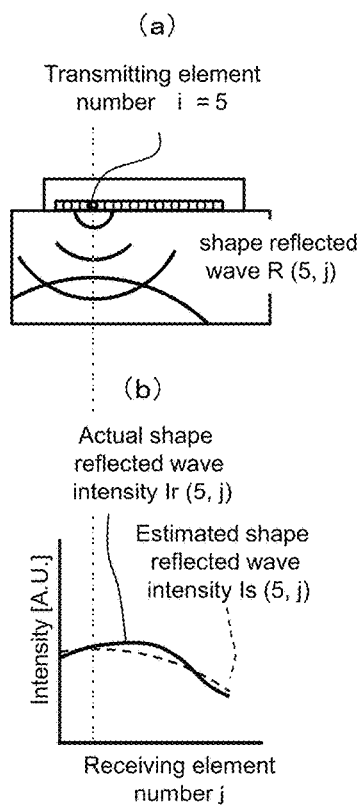
FIG. 27 s a schematic illustration showing the actual shape reflected wave intensity obtained by the actual shape reflected wave intensity extraction step in the ultrasonic inspection method according to the embodiment, where the transmitting element number i is 5.
Figure 28:
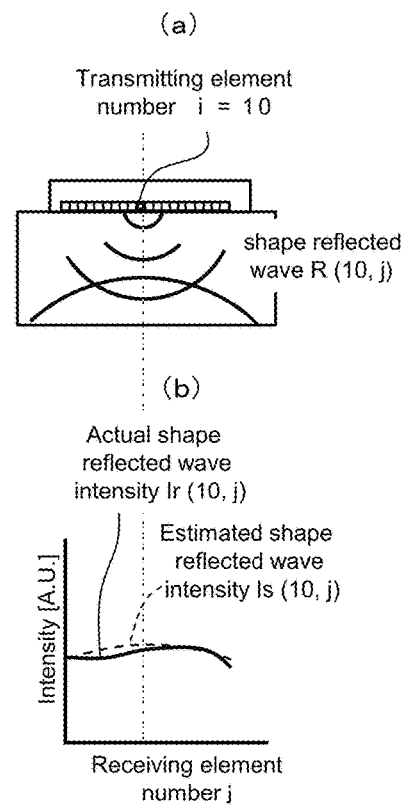
FIG. 28 s a schematic illustration showing the actual shape reflected wave intensity obtained by the actual shape reflected wave intensity extraction step in the ultrasonic inspection method according to the embodiment, where the transmitting element number i is 10.

FIG. 26 is a schematic illustration showing the actual shape reflected wave intensity obtained by the actual shape reflected wave intensity extraction step in the ultrasonic inspection method according to the embodiment, where the transmitting element number i is 1. FIG. 27 s a schematic illustration, where the transmitting element number i is 5. FIG. 28 s a schematic illustration, where the transmitting element number i is 10.

In each of FIG. 26, FIG. 27 and FIG. 28, the actual shape reflected wave intensity Ir (i, j) is indicated by a solid line and the estimated shape reflected wave intensity Is (i, j) is indicated by a broken line for the purpose of comparison. As shown in FIGS. 26, 27 and 28, when the test object 1 is made of an anisotropic material that gives variances in the sound velocity as a function of position and direction, the curve of the actual shape reflected wave intensity Ir (i, j) and the curve of the estimated shape reflected wave intensity Is (i, j) do not agree with each other.

The shape-reflected-wave intensity ratio comparator 39 then calculates the shape reflected wave intensities ratio (Step S33). More specifically, the shape-reflected-wave intensity ratio comparator 39 calculates the ratio of Ir (i, j) obtained by the actual shape-reflected-wave intensity extractor 38 relative to Is (i, j) obtained by the estimated shape-reflected-wave intensity calculator 37. The value obtained by normalizing Ir (i, j) by Is (i, j) for the combination of same elements is employed as the shape reflected wave intensities ratio Id (i, j).

Figure 29:
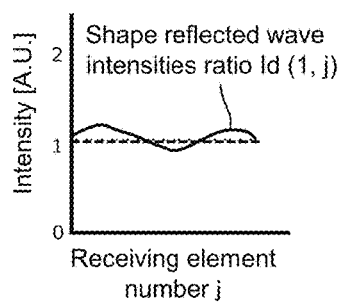
FIG. 29 is a schematic illustration showing the shape reflected wave intensity ratio in the ultrasonic inspection method according to the embodiment, where the transmitting element number i is 1.
Figure 30:
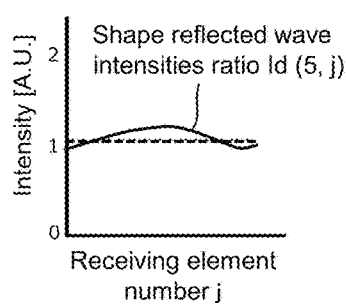
FIG. 30 is a schematic illustration showing the shape reflected wave intensity ratio in the ultrasonic inspection method according to the embodiment, where the transmitting element number i is 5.
Figure 31:
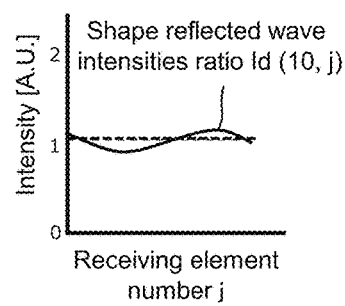
FIG. 31 is a schematic illustration showing the shape reflected wave intensity ratio in the ultrasonic inspection method according to the embodiment, where the transmitting element number i is 10.

FIG. 29 illustrate the shape reflected wave intensities ratio Id (i, j). FIG. 29 shows an instance where the transmitting element number is i=1, FIG. 30 shows an instance where the transmitting element number is i=5, and FIG. 31 shows an instance where the transmitting element number is i=10. As seen from FIGS. 29 through 31, the shape reflected wave intensities ratio Id (i, j) can take positive values that are centered at 1.

Then, the correction gain Gc (i, j) of each waveform Uf (i, j) to be used for the arithmetic operation for obtaining the synthetic waveform M is calculated on the basis of the shape reflected wave intensities ratio Id (i, j). For example, the reciprocal of the shape reflected wave intensities ratio Id (i, j) may be selected as the correction gain Gc (i, j). Then, the magnitude of the damping may be decreased depending on the propagation path by selecting and multiplying the waveform Uf (i, j) by the correction gain.

Note that the arithmetic operation for the time-related correction (Step S20) is independent of the arithmetic operation for the intensity-related correction (Step S30), and the intensity-related correction is not indispensable for the synthesis of the waveform Uf (i, j) of the actual shape reflected wave Rr (i, j) by the synthesizing calculator 40. In other words, the synthesizing calculator 40 can effectively operate for the synthesis even when the intensity-related correction has not been done.

After both the arithmetic operation for the time-related correction (Step S20) and the arithmetic operation for the intensity-related correction (Step S30) are carried out in a manner as described above, the operation of the waveform Uf (i, j) synthesis and the operation of imaging the synthetic waveform data are executed (Step S40).

Firstly, the synthesizing calculator 40 corrects the waveform whose intensity has been corrected according to the corrected delay time and then the synthesizing calculator 40 executes the synthesizing operation (Step S41). With regard to the intensity-related correction, the synthesizing calculator 40 executes the correcting operation by means of the correction gain Gc (i, j) obtained by the shape-reflected-wave intensity ratio comparator 39 in the shape reflected wave intensities ratio computing step S33. Note that additions, averaging or some other synthesizing techniques may be employed for the synthesizing operation.

With regard to the time-related correction, the synthesizing calculator 40 firstly allocates the delay times that have been corrected by the actual sound velocity calculator 36 in the actual sound velocity computing step S25 to the ultrasonic elements 11 that constitutes the group of drive elements. Then, the synthesizing calculator 40 executes the synthesizing operation to obtain the synthetic waveform M by respectively shifting the received signals obtained by the ultrasonic elements 11 by the delay times allocated to the ultrasonic elements 11 in the direction of the time axis.

Figure 32:
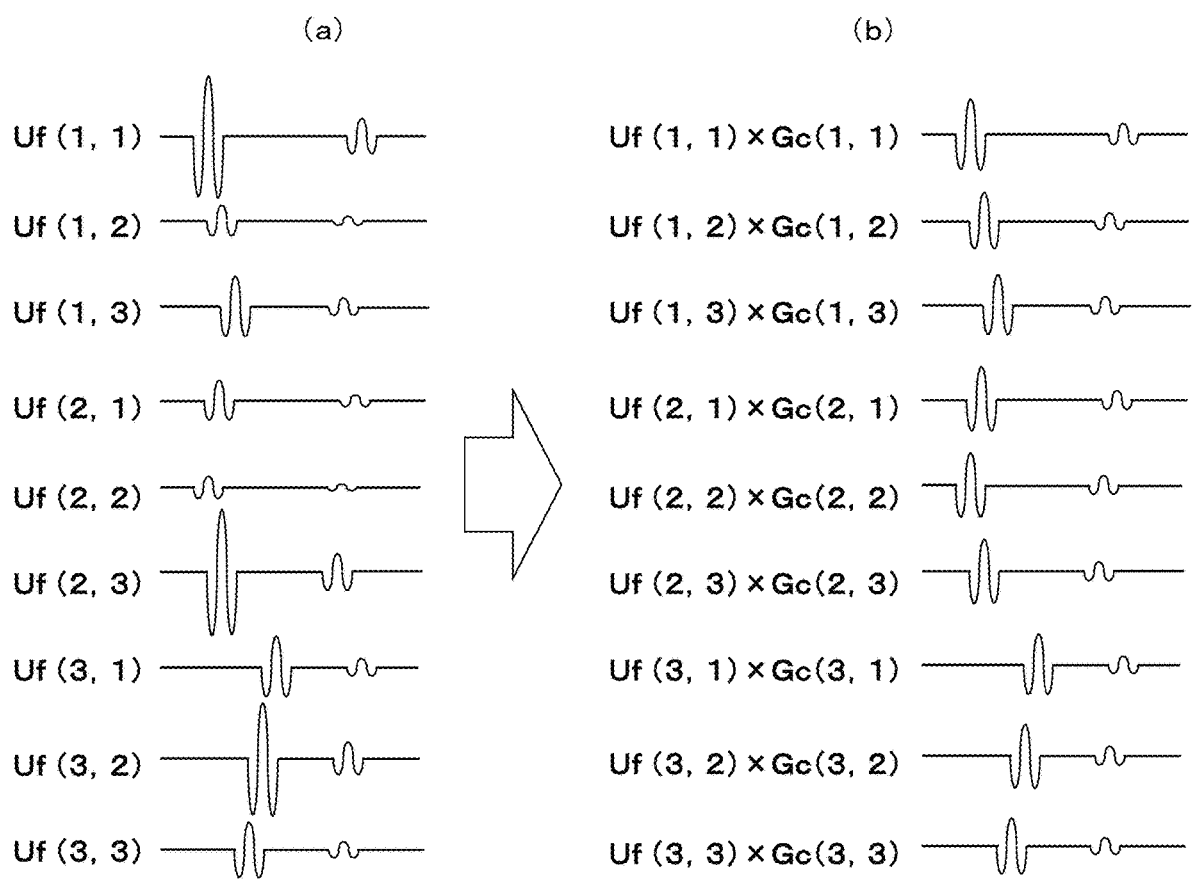
FIG. 32 is a schematic illustration showing the received signals by the ultrasonic elements in the ultrasonic inspection method according to the embodiment for explaining the state where the received wave intensity is corrected on the basis of shape reflected wave time difference after the correction of received wave intensity.

FIG. 32 is a schematic illustration showing the received signals by the ultrasonic elements in the ultrasonic inspection method according to the embodiment for explaining the state where the received wave intensity is corrected on the basis of shape reflected wave time difference after the correction of received wave intensity. Left part of FIG. 32 shows the waveforms Uf (i, j) before the execution of the intensity-related corrections for the respective ultrasonic elements 11. Right part of FIG. 32 shows the waveforms Uf (i, j) after the execution of the corrections by means of the correction gains Gc (i, j) for the respective ultrasonic elements 11.

Figure 33:
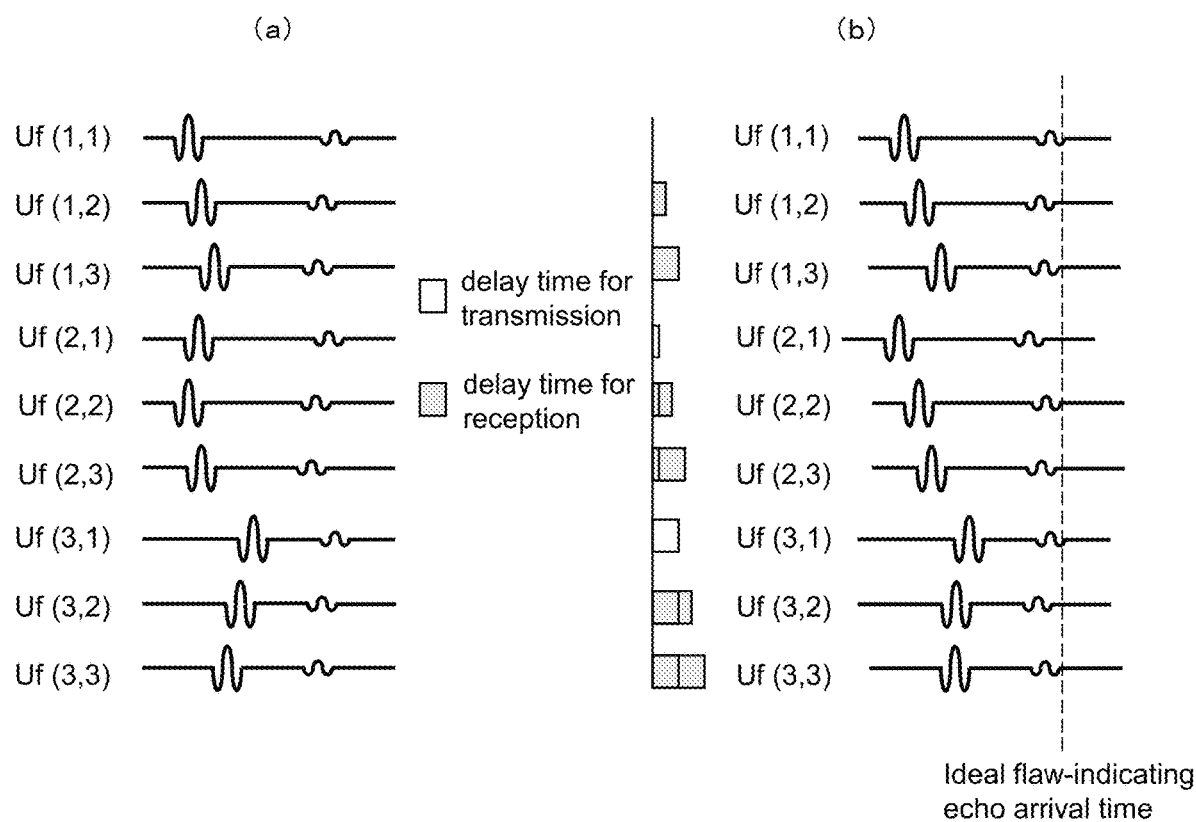
FIG. 33 is a schematic illustration showing the synthesized waves on the basis of shape reflected wave time difference after the correction of received wave intensity in the ultrasonic inspection method according to the embodiment.
Figure 34:
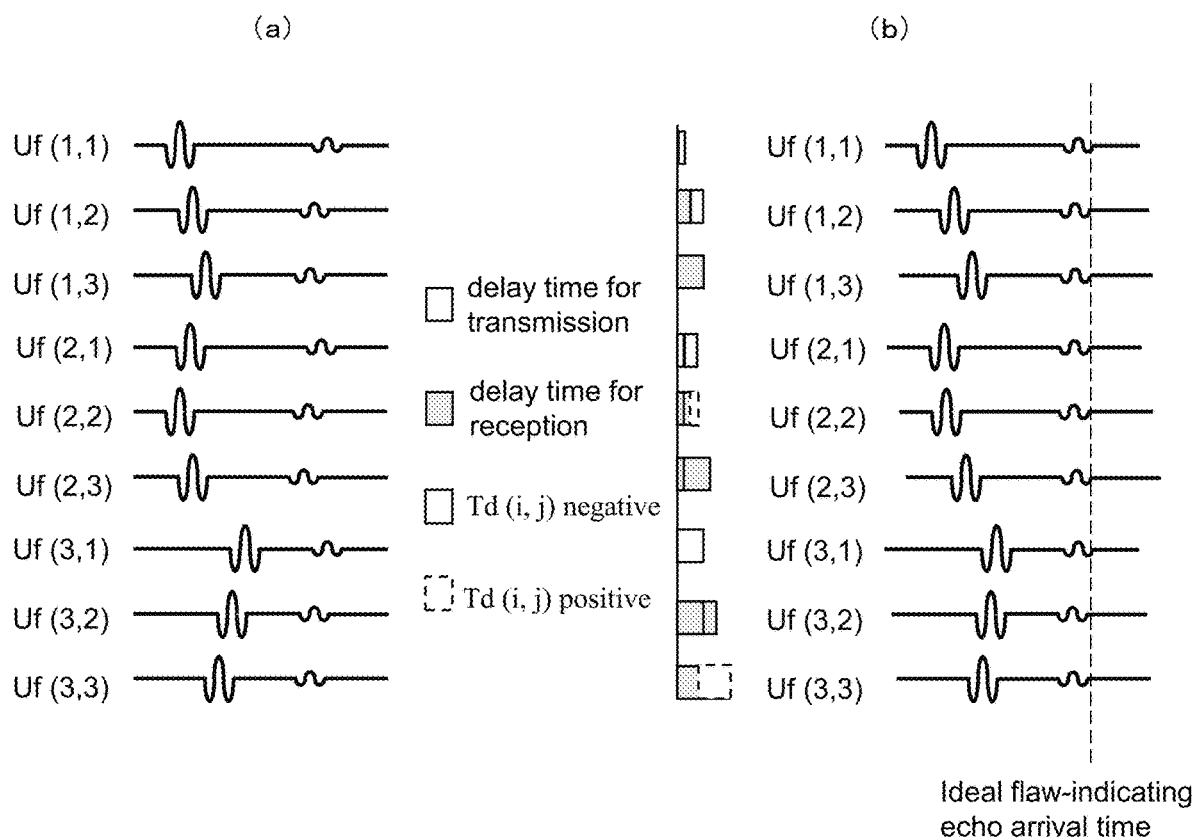
FIG. 34 is a schematic illustration showing the correction of the received waves after the correction of received wave intensity in the ultrasonic inspection method according to the embodiment.

FIG. 33 is a schematic illustration showing the synthesized waves on the basis of shape reflected wave time difference after the correction of received wave intensity in the ultrasonic inspection method according to the embodiment. FIG. 34 is a schematic illustration showing the correction of the received waves after the correction of received wave intensity in the ultrasonic inspection method according to the embodiment. As the received signals are shifted in the direction of the time axis by the sum of the delay time for transmission and the delay time for reception, the timings of the reflected waves from the flaw-indicating echoes that are attributable to the flaw 2 are aligned and the signal intensities are boosted as a result of the synthesizing operation.

Figure 35:
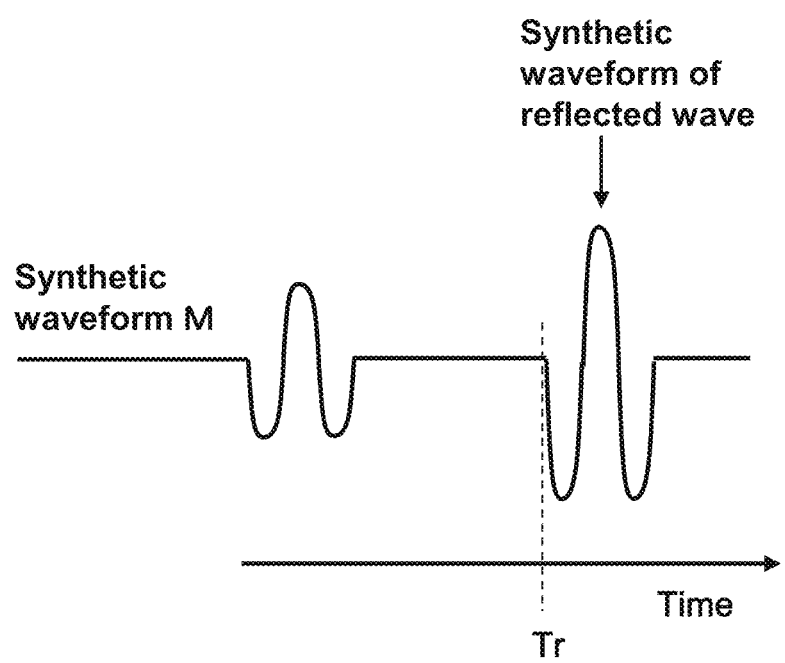
FIG. 35 is a schematic illustration showing the synthesizing of the received waves after the correction of received wave intensity in the ultrasonic inspection method according to the embodiment.

FIG. 35 is a schematic illustration showing the synthesizing of the received waves after the correction of received wave intensity in the ultrasonic inspection method according to the embodiment.

Thereafter, the operation of imaging the synthetic waveform data is executed (Step S42).

Figure 36:
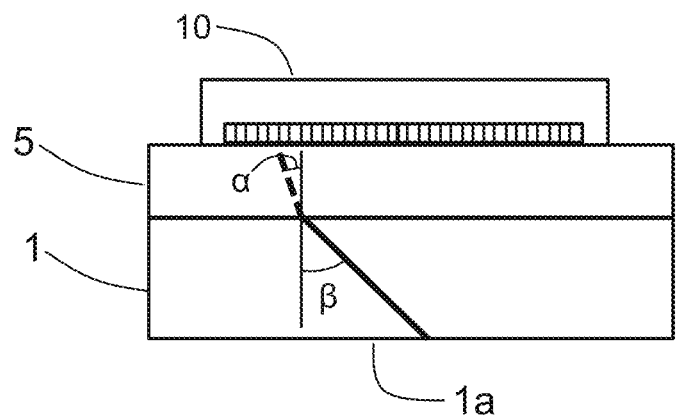
FIG. 36 is a schematic illustration showing a single beam for explaining imaging in the ultrasonic inspection method according to the embodiment.
Figure 37:
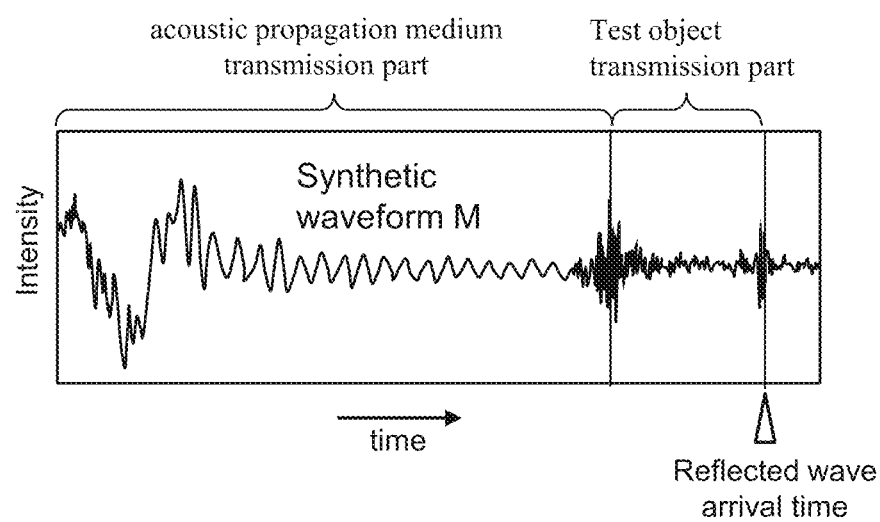
FIG. 37 is a schematic illustration showing synthesized wave in the ultrasonic inspection method according to the embodiment.

FIG. 36 is a schematic illustration showing a single beam for explaining imaging in the ultrasonic inspection method according to the embodiment. FIG. 37 is a schematic illustration showing synthesized wave in the ultrasonic inspection method according to the embodiment. As shown in FIG. 36, a synthetic waveform M as shown in FIG. 37 is obtained by the above-described sequence of operations on the basis of the results of transmissions of ultrasonic waves that are focused to a predetermined position in the test object 1, for example, to the rear surface 1a, as a shape-indicating part of the test object 1 as shown in FIG. 36.

Figure 38:
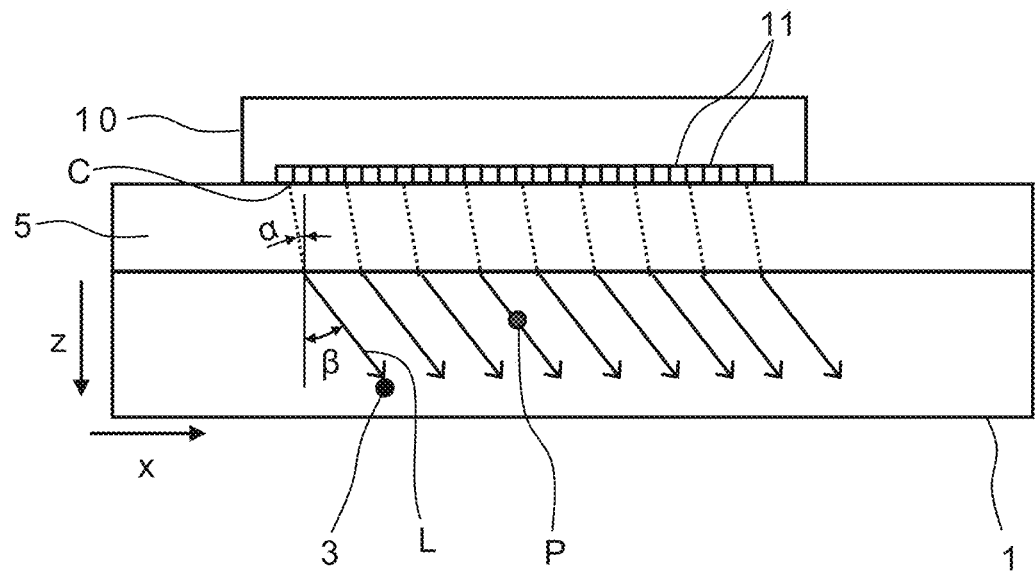
FIG. 38 is a schematic illustration showing a plurality of beams by linear scanning explaining imaging in the ultrasonic inspection method according to the embodiment.

FIG. 38 is a schematic illustration showing a plurality of beams by linear scanning explaining imaging in the ultrasonic inspection method according to the embodiment.

In FIG. 38, a plurality of beams produced by a linear scanning operation is shown to illustrate the imaging operation. Ultrasonic beams are sequentially shifted in the longitudinal direction for a linear scanning operation and a synthetic waveform M is obtained at each of the beam positions.

For the image generator 41 to prepare imaging data on the basis of the results of the linear scanning operation, it employs information on the delay time of each of the ultrasonic elements 11 to be used for the above-described waveform synthesis, on the ultrasonic beam propagation path L that is the path by way of which the synthetic waveform M propagates and on the actual sound velocity Va in the domain where the ultrasonic beam propagation path L runs among others in addition to the synthetic waveform M. The ultrasonic beam propagation path L is the sound propagation line that runs from the coordinates of the center C of the ultrasonic element 11 to be used for the synthesis to the focus 3 in the test object 1 and the point at which the ultrasonic wave enters from the acoustic propagation medium 5 into the test object 1 can be determined by means of Snell's law as in the instance of delay time computations. The synthetic waveform M moves on the ultrasonic beam propagation path L with time. In other words, the synthetic waveform M may be considered to develop along the ultrasonic beam propagation path L.

Therefore, the intensity of the ultrasonic wave at an arbitrarily selected position in the test object 1 can be calculated on the basis of the synthetic waveform M for the ultrasonic beam propagation path L that passes that position P. More specifically, the change with time of the waveform of the transmitted ultrasonic wave at the position P in the test object 1 can be computationally determined by using the actual sound velocity Va (i, j) and the path length to the position P on the ultrasonic beam propagation path L after the transmission.

A major part of the synthetic waveform M shown in FIGS. 36 and 37 is the part thereof that propagates through the acoustic propagation medium 5 and the actual sound velocity Va in the acoustic propagation medium 5 is low if compared with the actual sound velocity Va in the test object 1. Therefore, if the synthetic waveform M is drawn along the ultrasonic beam propagation path L, the part thereof in the acoustic propagation medium 5 is smaller than the part thereof in the test object 1.

Figure 39:
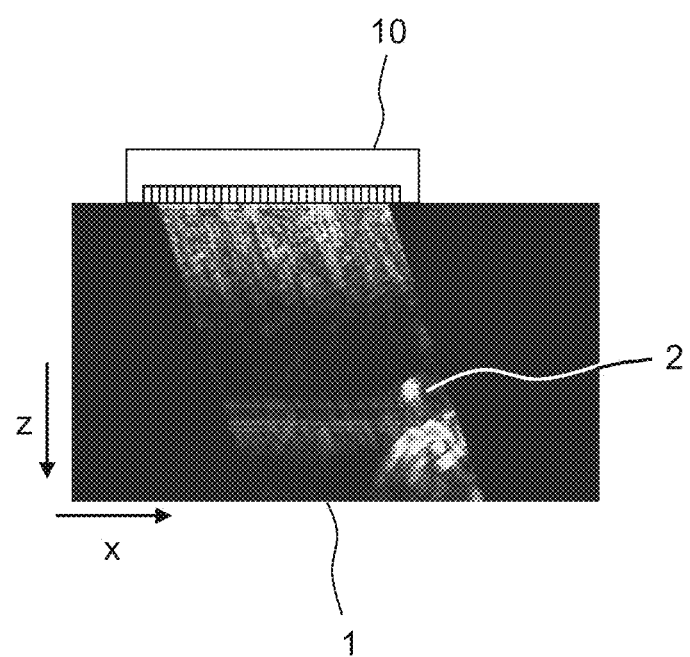
FIG. 39 is a schematic illustration showing an image for explaining imaging in the ultrasonic inspection method according to the embodiment.

FIG. 39 is a schematic illustration showing an image for explaining imaging in the ultrasonic inspection method according to the embodiment. Image data are prepared by the image generator 41 and an image as shown in FIG. 39 may be displayed on the display 70.

As described above, the ultrasonic inspection apparatus 100 according to the present embodiment can reduce the influence of anisotropy of the test object in ultrasonic flaw detection.

OTHER EMBODIMENTS

While the embodiments of the present invention have thus been described, the embodiments are presented as examples and are not intended to limit the scope of the invention.

Furthermore, the above-described embodiments may be put to use in various different ways and, if appropriate, any of the components thereof may be omitted, replaced or altered in various different ways without departing from the spirit and scope of the invention. All the above-described embodiments and the modifications made to them are within the spirit and scope of the present invention, which is specifically defined by the appended claims, as well as their equivalents.

What is claimed is:

1. An ultrasonic inspection apparatus comprising:
   an ultrasonic array probe having a plurality of ultrasonic elements arranged at predetermined positions for transmitting ultrasonic waves to a test object and receiving the ultrasonic waves reflected by the test object;
   a test object information acquiring section for acquiring information on the test object;
   an input unit for receiving inputs from outside and also from the test object information acquiring section;
   an estimated shape reflected wave arrival time calculator for computing an estimated shape reflected wave arrival time of each of estimated shape reflected waves on the basis of n estimated sound velocity in the test object, the estimated shape reflected wave arrival time being the estimated time for the estimated shape reflected wave to arrive at the ultrasonic elements when the ultrasonic waves are reflected at a shape-indicating reflection part thereof;
   an actual shape reflected wave arrival time extractor for extracting the actual shape reflected wave arrival time on the basis of n actual shape reflected wave transmitted from the ultrasonic element used for ultrasonic wave transmission, propagated through the test object, reflected by the shape-indicating reflection part and received by each of the ultrasonic elements used for receiving the ultrasonic waves;
   a shape reflected waves time difference calculator for computing a shape reflected waves time difference obtained by subtracting the actual shape reflected wave arrival time from the estimated shape reflected wave arrival time as shape reflected waves time difference; and a delay time calculator for computing delay times each of which is to be used for mutually shifting corresponding timing of ultrasonic wave transmission and reception by the ultrasonic elements, the delay time calculator using the shape reflected waves time differences for subtracting from each delay time, wherein the shape-indicating reflection part is a part of the test object that relates to an overall shape of the test object or a representative part of the test object in terms of the shape.

2. The ultrasonic inspection apparatus according to claim 1, wherein the delay time calculator is configured to multiply the shape reflected waves time difference by a weighting factor.

3. The ultrasonic inspection apparatus according to claim 1, further comprising:

a synthesizing calculator for computationally determining a synthetic waveform of the ultrasonic waves received by the ultrasonic elements.

4. The ultrasonic inspection apparatus according to claim 3, further comprising:

an estimated shape reflected wave intensity calculator for computing an estimated shape reflected wave intensity that is an intensity of the estimated shape reflected wave;

an actual shape reflected wave intensity extractor for extracting an actual shape reflected wave intensity that is the intensity of the actual shape reflected wave; and a shape reflected wave intensity ratio comparator for computing a ratio of the estimated shape reflected wave intensity to the actual shape reflected wave intensity as a correction gain; wherein the synthesizing calculator computationally determining the synthetic waveform after correcting the ultrasonic waves received by the ultrasonic elements respectively multiplied by the correction gains.

5. The ultrasonic inspection apparatus according to claim 3, further comprising:

an actual sound velocity calculator for computing an actual sound velocity by multiplying the estimated sound velocity by a ratio of the estimated shape reflected wave arrival time to the actual shape reflected wave arrival time; and an image generator for computationally determining an image data to be displayed by using the synthetic waveform based on a delay time calculated using the actual sound velocity.

6. An ultrasonic inspection method comprising:

an ultrasonic wave transmitting/receiving step for each of a plurality of ultrasonic elements belonging to an ultrasonic wave array probe to transmit an ultrasonic wave to a test object and receive reflected waves from the test object;

an estimated sound velocity calculating step for calculating an estimated sound velocity based on information relating to the test object gained by a test object information acquiring section and input unit;

an estimated shape reflected wave arrival time computing step for an estimated shape reflected wave arrival time calculator to calculate the estimated shape reflected wave arrival time on the basis of an estimated sound velocity in the test object;

an actual shape reflected wave arrival time extracting step for an actual shape reflected wave arrival extracting section to extract an actual shape reflected wave arrival time on the basis of an actual shape reflected wave transmitted by the ultrasonic elements to be used for transmission of ha ultrasonic wave, propagated through inside of the test object, reflected by a shape-indicating reflection part and received by the ultrasonic element to be used for reception of the ultrasonic wave;

a shape reflected waves time difference computing step for an shape reflected wave time difference computing section to calculate a time difference between the estimated shape reflected wave arrival time and the actual shape reflected wave arrival time as a shape reflected waves time difference; and a delay time computing step for a delay time calculator to calculate delay times each of which is to be used for mutually shifting corresponding timing of transmissions and receptions of ultrasonic waves by the ultrasonic elements, using the shape reflected waves time differences for subtracting from each delay time, wherein the shape-indicating reflection part is a part of the test object that relates to an overall shape of the test object or a representative part of the test object in terms of the shape.

* * * * *